United States Patent
Hefner et al.

(10) Patent No.: US 12,371,162 B2
(45) Date of Patent: Jul. 29, 2025

(54) PAYLOAD SADDLE ASSEMBLIES FOR USE ON AIRCRAFT

(71) Applicant: Textron Innovations Inc., Providence, RI (US)

(72) Inventors: Levi Charles Hefner, Dallas, TX (US); Kevin Fisher, Fort Worth, TX (US); Manuel Adrian Gonzalez, Plano, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/821,928

(22) Filed: Aug. 30, 2024

(65) Prior Publication Data

US 2024/0417072 A1    Dec. 19, 2024

Related U.S. Application Data

(63) Continuation of application No. 17/572,529, filed on Jan. 10, 2022, now Pat. No. 12,103,673.

(51) Int. Cl.
*B64D 1/12*    (2006.01)
*B64C 29/00*    (2006.01)
(Continued)

(52) U.S. Cl.
CPC .............. *B64D 1/12* (2013.01); *B64C 29/00* (2013.01); *B64C 29/0016* (2013.01);
(Continued)

(58) Field of Classification Search
CPC ... B64C 29/0016; B64C 39/024; B64D 27/40; F16B 2/06; B64U 2201/20
See application file for complete search history.

(56) References Cited

U.S. PATENT DOCUMENTS

| 1,655,113 A | 1/1928 | Nikola |
| 2,601,090 A | 6/1952 | James |

(Continued)

FOREIGN PATENT DOCUMENTS

| CN | 105539833 A | 5/2016 |
| FR | 2977865 A3 | 1/2013 |

(Continued)

OTHER PUBLICATIONS

Air Launched Unmanned Disaster Relief Delivery Vehicle, 33rd Annual AHS Student Design Competition, University of Maryland, Undated but admitted prior art.

(Continued)

*Primary Examiner* — Kimberly S Berona
*Assistant Examiner* — Steven J Shur
(74) *Attorney, Agent, or Firm* — Lawrence Youst PLLC

(57) ABSTRACT

A tailsitter aircraft includes an airframe having first and second wings with first and second pylons extending therebetween, a thrust array attached to the airframe, payloads and payload saddle assemblies coupled to the pylons each configured to secure a respective payload. The thrust array includes propulsion assemblies configured to transition the airframe between a forward flight orientation for wing-borne lift and a VTOL orientation for thrust-borne lift. Each payload saddle assembly includes a latch assembly and a retainer configured to secure the respective payload against a respective pylon. A latch assembly is movable between various positions including an open position and a closed position and is configured to secure the respective payload in the closed position and release the respective payload in the open position. Each latch assembly is configured to move from the closed position to the open position to release the respective payload in the VTOL orientation.

19 Claims, 15 Drawing Sheets

(51) Int. Cl.
  *B64C 39/02* (2023.01)
  *B64D 27/40* (2024.01)
  *B64U 10/13* (2023.01)
  *B64U 10/25* (2023.01)
  *F16B 2/06* (2006.01)
  *B64U 101/60* (2023.01)

(52) U.S. Cl.
  CPC ............ *B64C 39/02* (2013.01); *B64C 39/024* (2013.01); *B64D 27/402* (2024.01); *B64U 10/13* (2023.01); *B64U 10/25* (2023.01); *F16B 2/06* (2013.01); *B64U 2101/60* (2023.01); *B64U 2201/20* (2023.01)

(56) References Cited

U.S. PATENT DOCUMENTS

| | | |
|---|---|---|
| 2,655,997 A | 10/1953 | Peterson |
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,427,360 B2 | 4/2013 | Longstaff |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,266,249 B2 | 4/2019 | Shue |
| 10,301,016 B1 | 5/2019 | Bondarev et al. |
| 10,315,761 B2 | 6/2019 | McCullough et al. |
| 10,322,799 B2 | 6/2019 | McCullough et al. |
| 10,329,014 B2 | 6/2019 | McCullough et al. |
| 10,343,773 B1 | 7/2019 | McCullough et al. |
| 10,351,232 B2 | 7/2019 | McCullough et al. |
| 10,442,522 B2 | 10/2019 | Oldroyd et al. |
| 10,457,390 B2 | 10/2019 | McCullough et al. |
| 10,501,193 B2 | 12/2019 | Oldroyd et al. |
| 10,583,921 B1 | 3/2020 | McCullough et al. |
| 10,597,164 B2 | 3/2020 | Oldroyd et al. |
| 10,604,249 B2 | 3/2020 | McCullough et al. |
| 10,611,477 B1 | 4/2020 | McCullough et al. |
| 10,618,646 B2 | 4/2020 | McCullough et al. |
| 10,618,647 B2 | 4/2020 | McCullough et al. |
| 10,625,853 B2 | 4/2020 | McCullough et al. |
| 10,633,087 B2 | 4/2020 | McCullough et al. |
| 10,633,088 B2 | 4/2020 | McCullough et al. |
| 10,661,892 B2 | 5/2020 | McCullough et al. |
| 10,737,765 B2 | 8/2020 | Oldroyd et al. |
| 10,737,778 B2 | 8/2020 | Oldroyd et al. |
| 10,752,350 B2 | 8/2020 | McCullough et al. |
| 10,870,487 B2 | 12/2020 | McCullough et al. |
| 10,913,541 B2 | 2/2021 | Oldroyd et al. |
| 10,981,661 B2 | 4/2021 | Oldroyd et al. |
| 11,027,837 B2 | 6/2021 | McCullough et al. |
| 11,084,579 B2 | 8/2021 | Ivans et al. |
| 11,091,257 B2 | 8/2021 | McCullough et al. |
| 11,104,446 B2 | 8/2021 | McCullough et al. |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2007/0212224 A1 | 9/2007 | Podgurski |
| 2007/0221780 A1 | 9/2007 | Builta |
| 2008/0125920 A1 | 5/2008 | Miles et al. |
| 2009/0008499 A1 | 1/2009 | Shaw |
| 2010/0147993 A1 | 6/2010 | Annati et al. |
| 2010/0193644 A1 | 8/2010 | Karem |
| 2010/0295321 A1 | 11/2010 | Bevirt |
| 2011/0001001 A1 | 1/2011 | Bryant |
| 2011/0042508 A1 | 2/2011 | Bevirt |
| 2011/0042509 A1 | 2/2011 | Bevirt et al. |

(56) References Cited

U.S. PATENT DOCUMENTS

| | | |
|---|---|---|
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0175404 A1 | 7/2013 | Shefer |
| 2013/0341458 A1 | 12/2013 | Sutton et al. |
| 2014/0018979 A1 | 1/2014 | Goossen et al. |
| 2014/0032034 A1 | 1/2014 | Raptopoulos et al. |
| 2014/0097290 A1 | 4/2014 | Leng |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0081028 A1 | 3/2017 | Jones et al. |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1* | 5/2019 | McCullough .......... G05D 1/101 244/23 B |
| 2019/0193856 A1* | 6/2019 | Prager ..................... B64D 1/22 |
| 2019/0263516 A1 | 8/2019 | McCullough et al. |
| 2019/0263521 A1* | 8/2019 | O'Brien .................. B64D 1/12 |
| 2019/0375499 A1 | 12/2019 | McCullough et al. |
| 2019/0389573 A1 | 12/2019 | Kahou et al. |
| 2020/0140085 A1 | 5/2020 | Deng et al. |
| 2020/0172241 A1* | 6/2020 | Green .................... B64U 10/13 |

FOREIGN PATENT DOCUMENTS

| | | |
|---|---|---|
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.

Bell APT—Automatic Pod Transport; SUASNEWS.com; Dec. 6, 2017.

Bell Autonomous Pod Transport; MONCH.com; May 2, 2018.

Duffy, et al., The LIFT! Project—Modular, Electric Vertical Lift System with Ground Power Tether, AHS 71st Annual Forum, Virginia Beach, Virginia, May 2015.

Kang, et al., Gap and Stagger Effects on Biplanes with End Plates, 47th AIAA Aerospace Sciences Meeting Including The New Horizons Forum and Aerospace Exposition, Orlando, Florida, Jan. 2009.

Munk, General Biplane Theory, National Advisory Committee for Aeronautics, Unknown Date.

Wolfe, Frank; Bell Moving to Scale Up Antonymous Delivery Drones for US Military; Rotor & Wing International; Sep. 27, 2018.

* cited by examiner

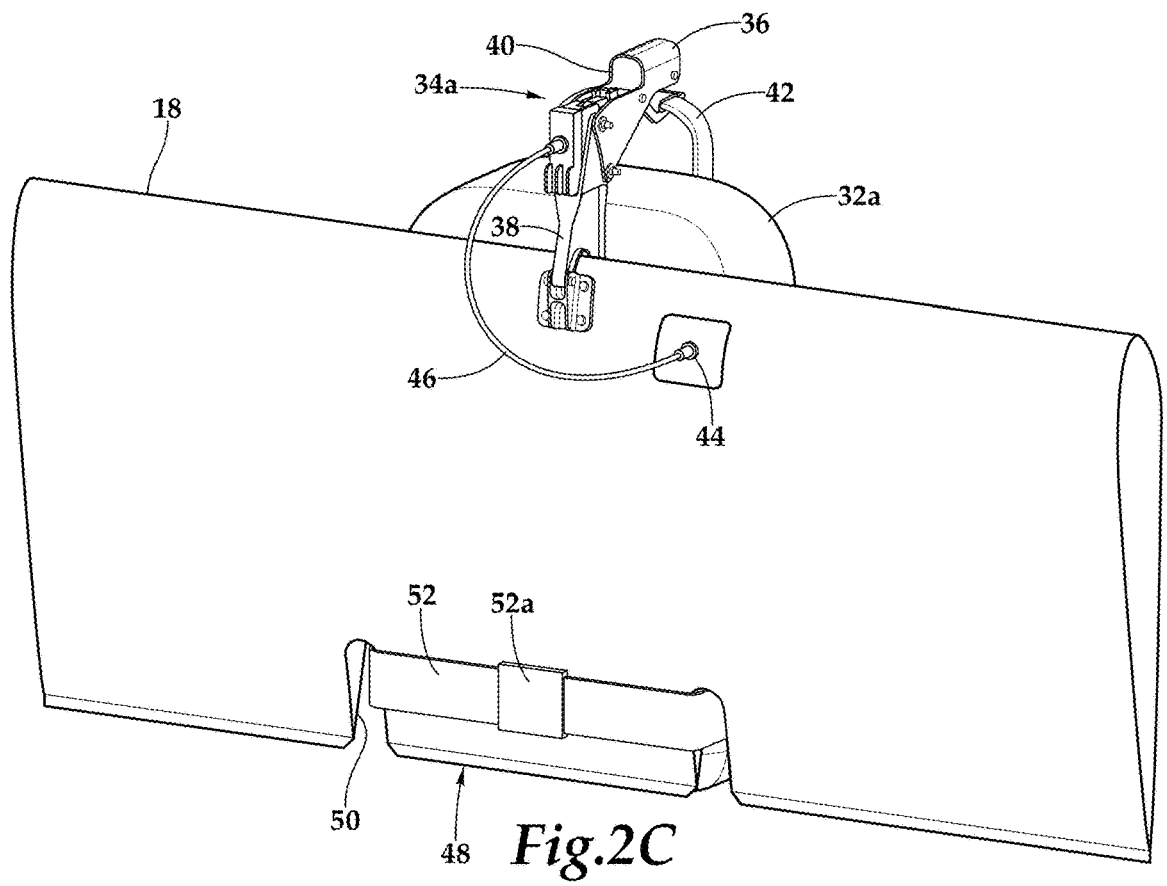
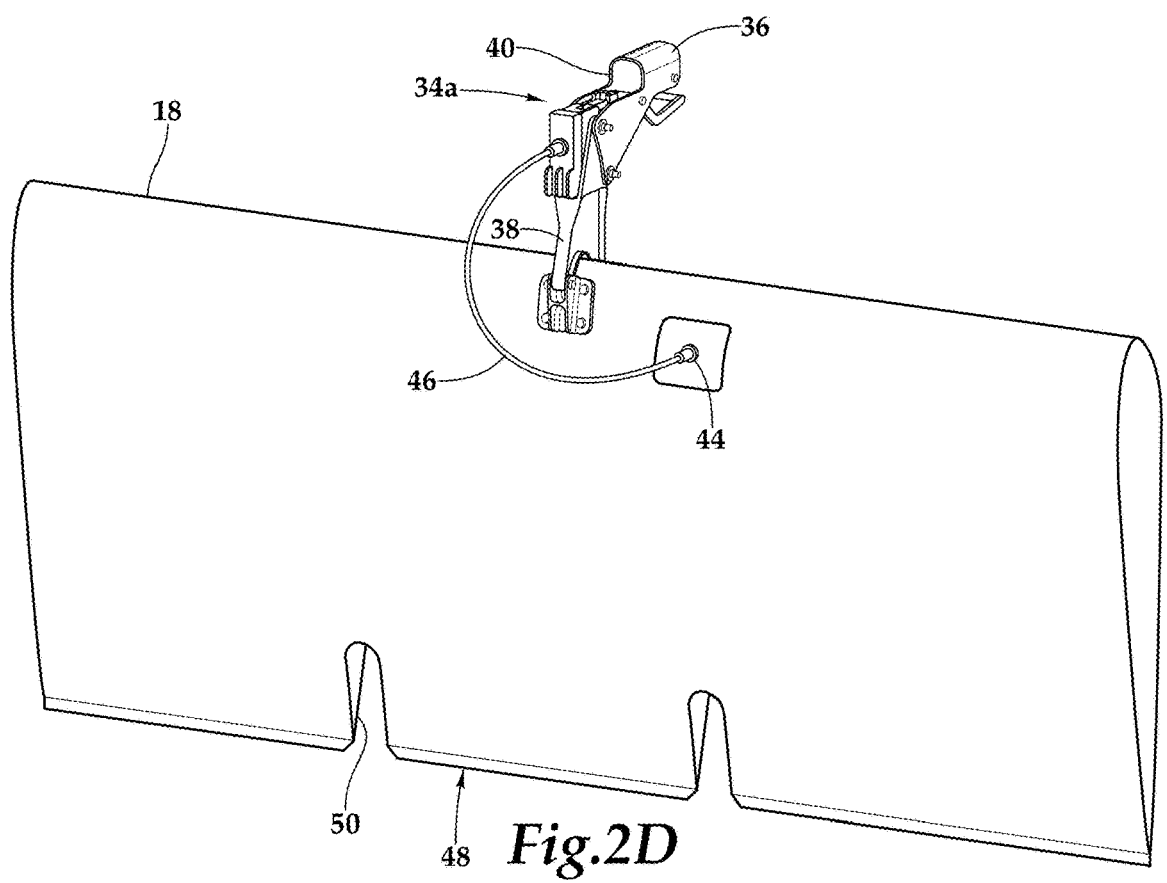

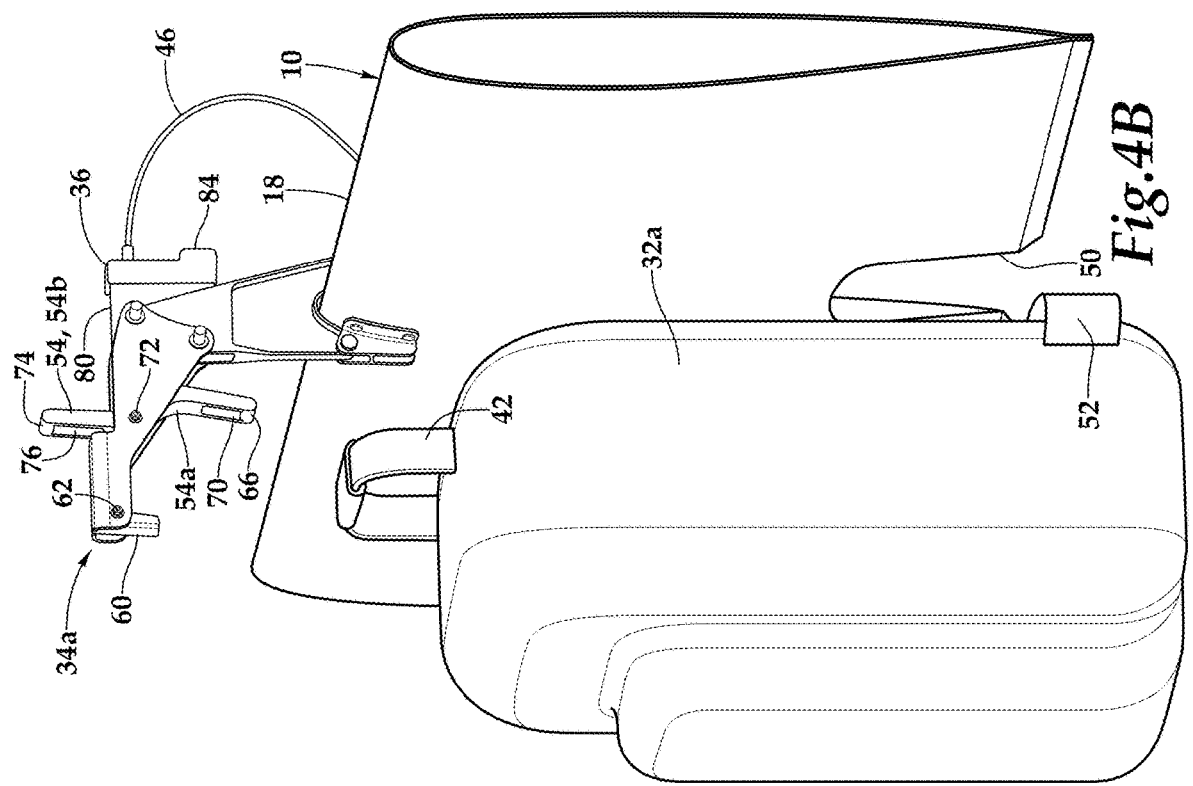
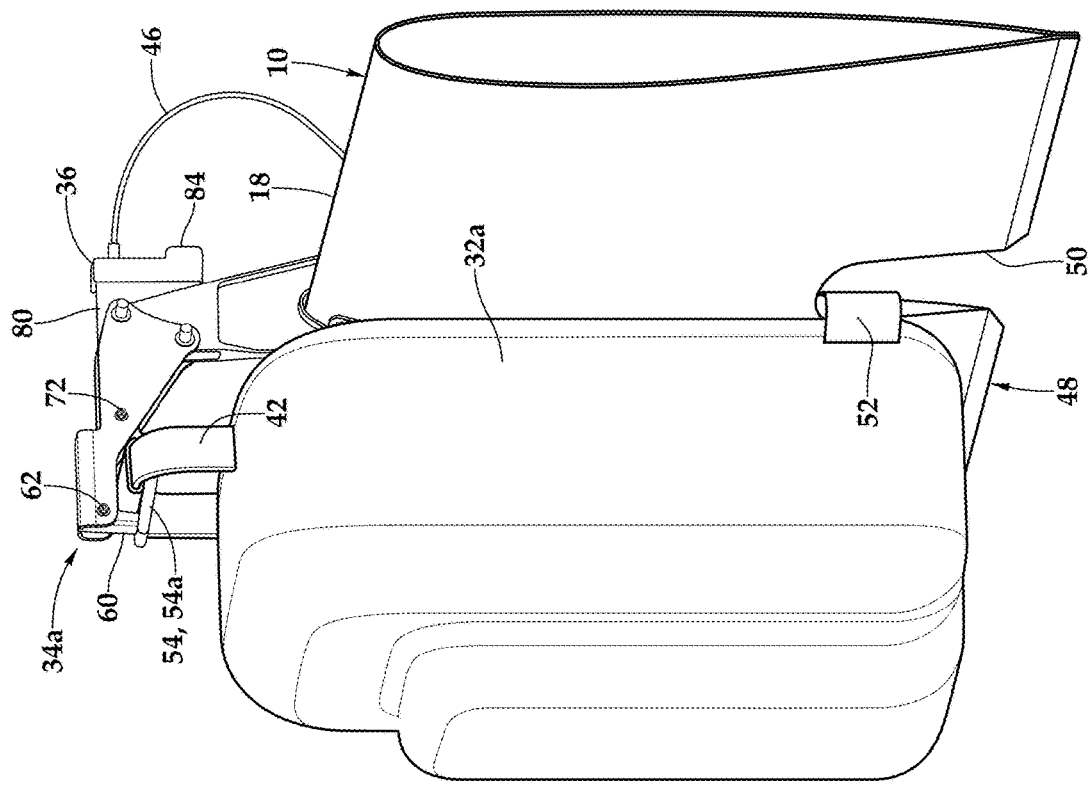
Fig.4A
Fig.4B

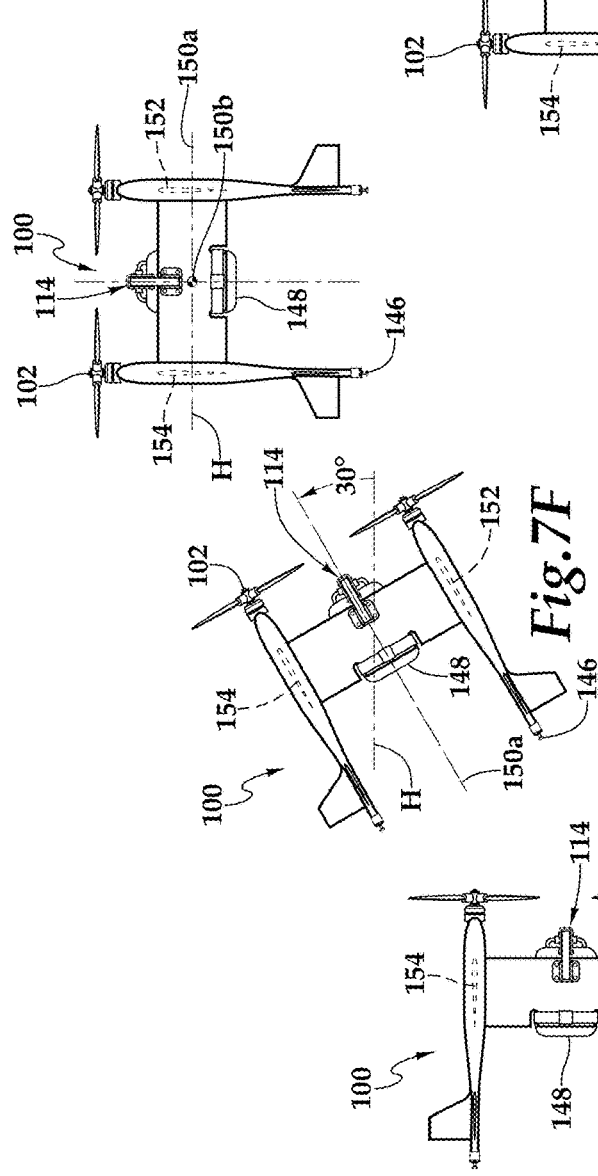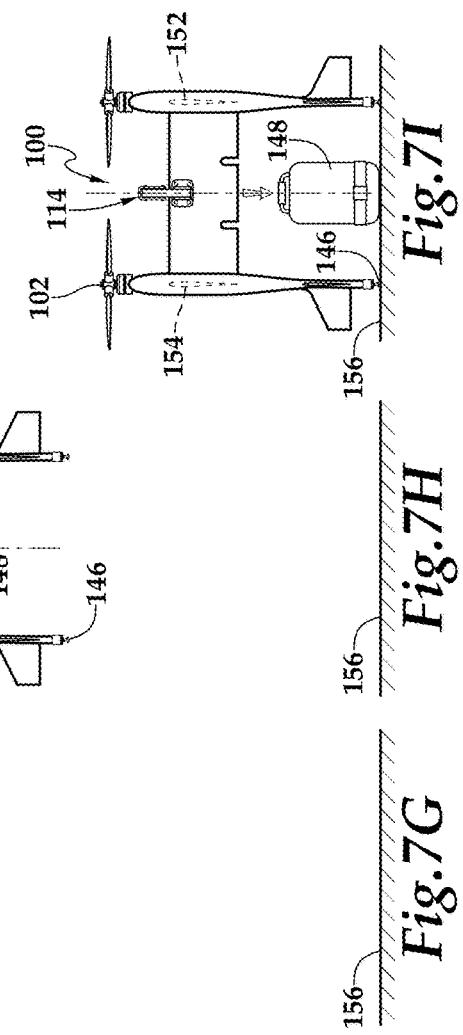

PAYLOAD SADDLE ASSEMBLIES FOR USE ON AIRCRAFT

CROSS-REFERENCE TO RELATED APPLICATIONS

The present application is a continuation of co-pending application Ser. No. 17/572,529 filed Jan. 10, 2022.

TECHNICAL FIELD OF THE DISCLOSURE

The present disclosure relates, in general, to payload delivery systems for aircraft configured to convert between thrust-borne lift in a VTOL orientation and wing-borne lift in a forward flight orientation and, in particular, to payload saddle assemblies employed on such aircraft to deliver payloads such as backpacks to intended targets on the ground without requiring human intervention.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off and landing vertically. Rotorcraft such as helicopters, tiltrotors, tiltwings, quadcopters, tailsitters and other multicopters are examples of VTOL aircraft. Each of these rotorcraft utilizes one or more rotors to provide lift and thrust to the aircraft. The rotors not only enable vertical takeoff and landing, but may also enable hover, forward flight, backward flight and lateral flight. These attributes make VTOL aircraft highly versatile for use in congested, isolated or remote areas. Some types of VTOL aircraft such as tailsitters, tiltrotors and tiltwings are convertible between a forward flight orientation, in which the rotors provide forward thrust with the forward airspeed of the VTOL aircraft allowing for wing-borne lift enabling the VTOL aircraft to have a high forward speed, and a VTOL orientation, in which the rotors provide thrust-borne lift. Unmanned aerial systems (UAS), also known as unmanned aerial vehicles (UAV) or drones, are self-powered fixed-wing or VTOL aircraft that do not carry a human operator, use aerodynamic forces to provide vehicle lift, are autonomously and/or remotely operated, may be expendable or recoverable and may carry lethal or nonlethal payloads. UAS may be used in military, commercial, scientific, recreational and other applications.

UAS and other VTOL aircraft may be used to deliver payloads such as packages, supplies or weapons to intended targets such as personnel, customers or combat targets on the ground. One goal of payload delivery missions is to deliver the payload to the intended target as quickly and efficiently as possible. Previous UAS have utilized enclosures that carry an internal payload, requiring a human operator to load and unload the payload using a door. Because human intervention is required to open and close the door of the enclosure, the internal payload is unable to be released while the UAS is airborne or in remote areas. Accordingly, a need has arisen for automated payload delivery systems that are capable of transporting and deploying payloads to intended ground targets without requiring human intervention.

SUMMARY

In a first aspect, the present disclosure is directed to a tailsitter aircraft including an airframe having first and second wings with first and second pylons extending therebetween, a thrust array attached to the airframe, payloads and payload saddle assemblies coupled to the pylons each configured to secure a respective payload. The thrust array includes propulsion assemblies configured to transition the airframe between a forward flight orientation for wing-borne lift and a VTOL orientation for thrust-borne lift. Each payload saddle assembly includes a latch assembly and a retainer configured to secure the respective payload against a respective pylon. A latch assembly is movable between various positions including an open position and a closed position and is configured to secure the respective payload in the closed position and release the respective payload in the open position. Each latch assembly is configured to move from the closed position to the open position to release the respective payload in the VTOL orientation.

In some embodiments, the payloads may include a backpack. In certain embodiments, the latch assemblies may be coupled to leading edges of the pylons. In some embodiments, the latch assemblies may be cantilevered latch assemblies, each cantilevered latch assembly including a base coupled to the leading edge of one of the pylons and a cantilevered arm projecting in the inboard or outboard direction. In certain embodiments, each latch assembly may include a hook configured to pivot about a pivot joint, the hook pivotable about the pivot joint into various positions including the open and closed positions. In such embodiments, the hook may releasably secure the respective payload via a handle on the payload.

In some embodiments, each latch assembly may include a hook latch movable between a locked position to lock the hook in the closed position and an unlocked position to release the hook. In certain embodiments, the hook may include a hook pin and the hook latch may interface the hook pin to lock the hook in the closed position. In some embodiments, each latch assembly may include an actuator configured to move the hook latch between the locked and unlocked positions. In certain embodiments, each latch assembly may include a trigger to manually move the hook latch between the locked and unlocked positions. In some embodiments, the hook may pivot from the closed position to the open position when the hook latch is in the unlocked position in response to the weight of the respective payload. In certain embodiments, each latch assembly may include a cantilevered arm and the hook and the cantilevered arm may form a payload loading passage when the hook is in the closed position to receive the handle of the respective payload. In such embodiments, each latch assembly may include a one-way gate flap bridging the payload loading passage, the gate flap rotatable between an open position to receive the handle onto the hook and a closed position to block the handle from exiting the hook when the hook is in the closed position. In some embodiments, the gate flap may be rotatably coupled to the cantilevered arm via a hinge joint, the hinge joint including a spring configured to bias the gate flap into the closed position. In certain embodiments, the hook may form an aperture to provide clearance for the gate flap to rotate between the open and closed positions.

In some embodiments, each payload may include a strap and each retainer may be formed by notches in a trailing end of the respective pylon, the payload strap configured to wrap around the retainer via the notches to secure the respective payload against the respective pylon. In certain embodiments, each retainer may include first and second retaining walls coupled to the respective pylon to secure the respective payload in the forward flight orientation. In some embodiments, each payload may include straps and each retaining wall may include a retainer post, the straps each configured to wrap around a respective retainer post. In certain embodiments, each retainer may include a support wall interconnecting the first and second retaining walls, the support wall coupled to the respective pylon.

In a second aspect, the present disclosure is directed to an aircraft system including a remote system and a tailsitter aircraft in communication with the remote system. The tailsitter aircraft includes an airframe having first and second wings with first and second pylons extending therebetween, a thrust array attached to the airframe, payloads and payload saddle assemblies coupled to the pylons each configured to secure a respective payload. The thrust array includes propulsion assemblies configured to transition the airframe between a forward flight orientation for wing-borne lift and a VTOL orientation for thrust-borne lift. Each payload saddle assembly includes a latch assembly movable between various positions including an open position and a closed position and is configured to secure the respective payload in the closed position and release the respective payload in the open position. Each latch assembly is configured to move from the closed position to the open position in response to a command from the remote system to release the respective payload in the VTOL orientation.

In some embodiments, the payload saddle assemblies may include first and second payload saddle assemblies coupled to the first and second pylons, respectively. In certain embodiments, the payload saddle assemblies may include first and second pluralities of payload saddle assemblies, the first plurality of payload saddle assemblies coupled to the first pylon and the second plurality of payload saddle assemblies coupled to the second pylon. In some embodiments, the first and second pluralities of payload saddle assemblies may be in collinear alignment. In certain embodiments, each payload saddle assembly may secure the respective payload against either an inboard side or an outboard side of a respective pylon.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2D are isometric views of an aircraft pylon having a payload saddle assembly in accordance with embodiments of the present disclosure;

FIGS. 4A-4E are isometric views of a payload saddle assembly in accordance with embodiments of the present disclosure;

FIGS. 7A-7I are schematic illustrations of an aircraft with payload saddle assemblies in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
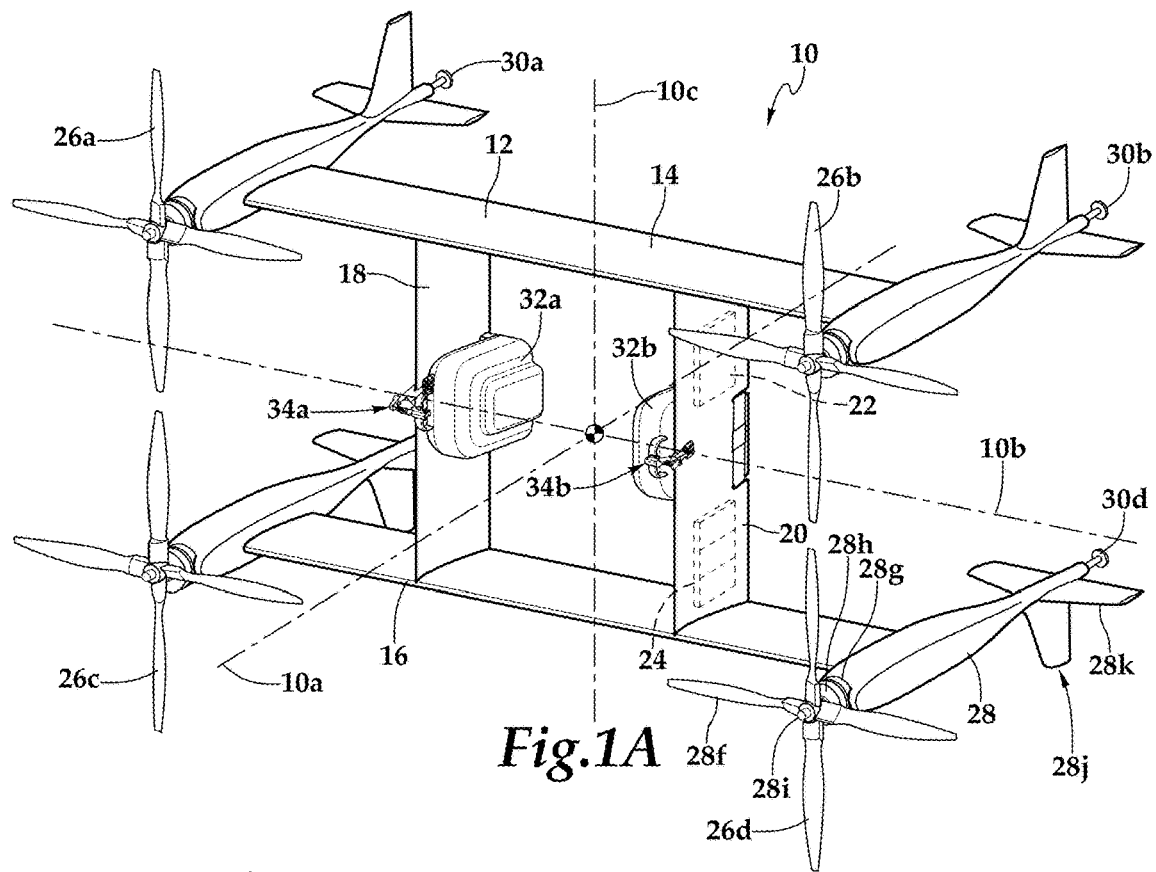
FIGS. 1A-1B are schematic illustrations of an aircraft with payload saddle assemblies that is operable to convert between thrust-borne lift in a VTOL orientation and wing-borne lift in a biplane orientation in accordance with embodiments of the present disclosure.
Figure 1B:
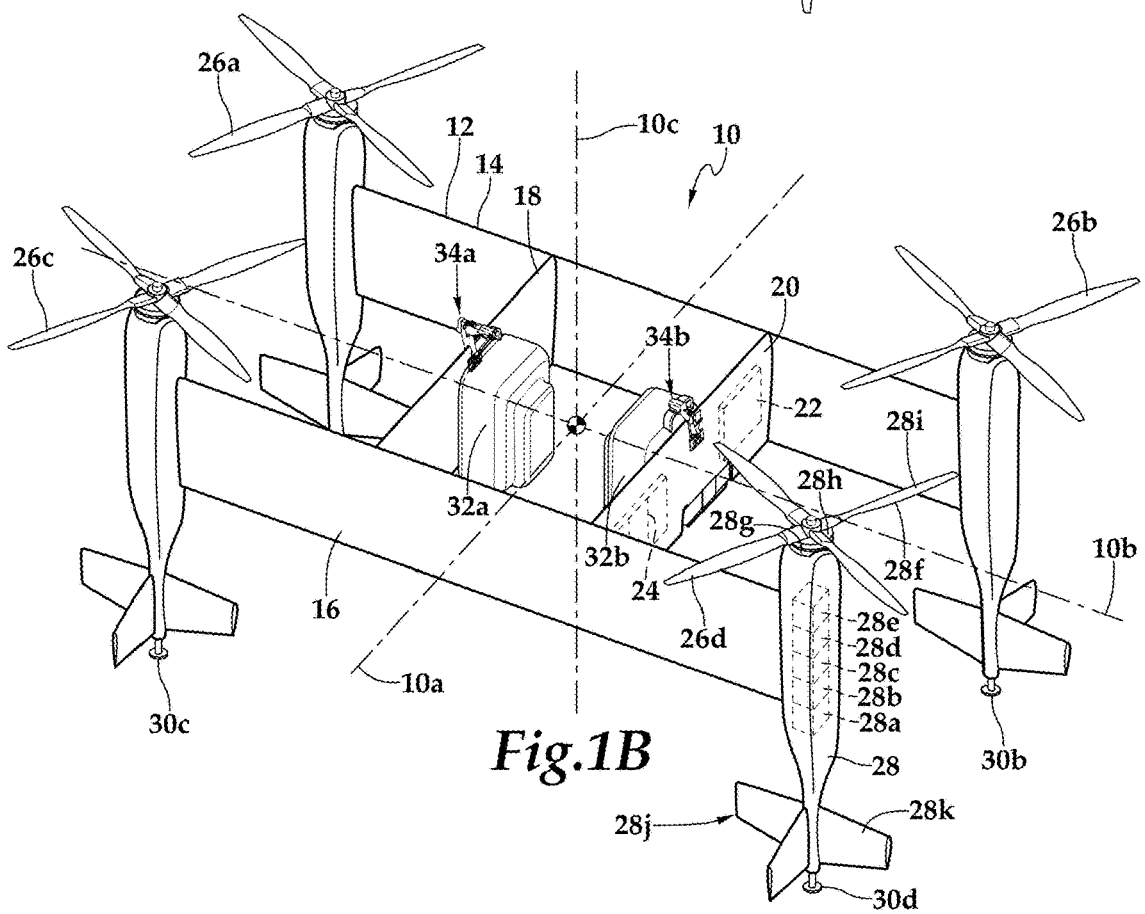

Referring to FIGS. 1A-1B in the drawings, isometric views of a tailsitter aircraft 10 with payload saddle assemblies that is operable to transition between thrust-borne lift in a VTOL orientation and wing-borne lift in a biplane orientation are depicted. FIG. 1A depicts aircraft 10 in the biplane orientation wherein the propulsion assemblies provide forward thrust with the forward airspeed of aircraft 10 providing wing-borne lift enabling aircraft 10 to have a high speed and/or high endurance forward flight mode. FIG. 1B depicts aircraft 10 in the VTOL orientation wherein the propulsion assemblies provide thrust-borne lift. Aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude. In the illustrated embodiment, the length of aircraft 10 in the direction of lateral axis 10b is greater than the width of aircraft 10 in the direction of longitudinal axis 10a in the VTOL orientation of aircraft 10, as depicted in FIG. 1B. Both the magnitudes of the length and the width of aircraft 10 as well as the difference between the length and the width of aircraft 10 are important relative to the landing stability of aircraft 10 as well as the tip-over stability of aircraft 10 when aircraft 10 is positioned on a surface such as the ground in a tailsitter orientation.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. In the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other.

One or more of wings 14, 16 and/or pylons 18, 20 may contain flight control systems, energy sources, communication lines and other desired systems. For example, pylon 20 houses flight control system 22 of aircraft 10. Flight control system 22 is preferably a redundant digital flight control system including multiple independent flight control computers. For example, the use of a triply redundant flight control system 22 improves the overall safety and reliability of aircraft 10 in the event of a failure in flight control system 22. Flight control system 22 preferably includes non-transitory computer readable storage media including a set of computer instructions executable by one or more processors for controlling the operation of aircraft 10. Flight control system 22 may be implemented on one or more general-purpose computers, special purpose computers or other machines with memory and processing capability. For example, flight control system 22 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 22 may be a microprocessor-based system operable to execute program code in the form of machine-executable instructions. In addition, flight control system 22 may be selectively connectable to other computer systems via a proprietary encrypted network, a public encrypted network, the Internet or other suitable communication network that may include both wired and wireless connections.

One or more of wings 14, 16 and/or pylons 18, 20 may contain one or more electrical power sources depicted as a plurality of batteries 24 in pylon 20. Batteries 24 supply electrical power to flight control system 22, the distributed thrust array of aircraft 10 and/or other power consumers of aircraft 10 such that aircraft 10 may be referred to as an electric vertical takeoff and landing (eVTOL) aircraft. In other embodiments, aircraft 10 may have a hybrid power system that includes one or more internal combustion engines and an electric generator. Preferably, the electric generator is used to charge batteries 24. In other embodiments, the electric generator may provide power directly to a power management system and/or the power consumers of aircraft 10. In still other embodiments, aircraft 10 may use fuel cells as the electrical power source.

Wings 14, 16 and/or pylons 18, 20 also contain a wired and/or wireless communication network that enables flight control system 22 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 26a, 26b, 26c, 26d and collectively referred to as propulsion assemblies 26. In the illustrated embodiment, propulsion assemblies 26a, 26b are coupled at the wingtips of wing 14 and propulsion assemblies 26c, 26d are coupled at the wingtips of wing 16. By positioning propulsion assemblies 26a, 26b, 26c, 26d at the wingtips of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 26 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 26 relative to other propulsion assemblies 26.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 26 in a wingtip mounted configuration, the distributed thrust array of aircraft 10 could have propulsion assemblies coupled to the wings and/or pylons in other configurations such as mid-span configurations. Further, even though the illustrated embodiment depicts propulsion assemblies 26 in a mid-wing configuration, the distributed thrust array of aircraft 10 could have propulsion assemblies coupled to the wings in a low wing configuration, a high wing configuration or any combination or permutation thereof. In the illustrated embodiment, propulsion assemblies 26 are variable speed propulsion assemblies having fixed pitch rotor blades and thrust vectoring capability. Depending upon the implementation, propulsion assemblies 26 may have longitudinal thrust vectoring capability, lateral thrust vectoring capability or omnidirectional thrust vectoring capability. In other embodiments, propulsion assemblies 26 may operate as single speed propulsion assemblies, may have variable pitch rotor blades and/or may be non-thrust vectoring propulsion assemblies.

Propulsion assemblies 26 may be independently attachable to and detachable from airframe 12 and may be standardized and/or interchangeable units and preferably line replaceable units (LRUs) providing easy installation and removal from airframe 12. The use of line replaceable propulsion units is beneficial in maintenance situations if a fault is discovered with one of the propulsion assemblies. In this case, the faulty propulsion assembly 26 can be decoupled from airframe 12 by simple operations and another propulsion assembly 26 can then be attached to airframe 12. In other embodiments, propulsion assemblies 26 may be permanently coupled to wings 14, 16.

Referring to FIG. 1B, component parts of propulsion assembly 26d will now be described. It is noted that propulsion assembly 26d is representative of each propulsion assembly 26 therefore, for sake of efficiency, certain features have been disclosed only with reference to propulsion assembly 26d. One having ordinary skill in the art, however, will fully appreciate an understanding of each propulsion assembly 26 based upon the disclosure herein of propulsion assembly 26d. In the illustrated embodiment, propulsion assembly 26d includes a nacelle 28 that houses components including a battery 28a, an electronic speed controller 28b, one or more actuators 28c, an electronics node 28d, one or more sensors 28e and other desired electronic equipment. Nacelle 28 also supports a propulsion system 28f including a gimbal 28g, a variable speed electric motor 28h and a rotor assembly 28i. Extending from a lower end of nacelle 28 is a tail assembly 28j that includes one or more aerosurfaces 28k. In the illustrated embodiment, aerosurfaces 28k include stationary horizontal and vertical stabilizers. In other embodiments, aerosurfaces 28k may be active aerosurfaces that serve as elevators to control the pitch or angle of attack of wings 14, 16 and/or ailerons to control the roll or bank of aircraft 10 in the biplane orientation of aircraft 10. Aerosurfaces 28k also serve to enhance hover stability in the VTOL orientation of aircraft 10.

Flight control system 22 communicates via a wired communications network within airframe 12 with electronics nodes 28d of propulsion assemblies 26. Flight control system 22 receives sensor data from sensors 28e and sends flight command information to the electronics nodes 28d such that each propulsion assembly 26 may be individually and independently controlled and operated. For example, flight control system 22 is operable to individually and independently control the speed and the thrust vector of each propulsion system 28f. Flight control system 22 may autonomously control some or all aspects of flight operation for aircraft 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for aircraft 10.

Aircraft 10 has a landing gear assembly 30 that includes a plurality of landing feet depicted as landing foot 30a coupled to a lower or aft end of propulsion assembly 26a, landing foot 30b coupled to a lower or aft end of propulsion assembly 26b, landing foot 30c coupled to a lower or aft end of propulsion assembly 26c and landing foot 30d coupled to a lower or aft end of propulsion assembly 26d. By positioning landing feet 30a, 30b, 30c, 30d at the lower end of wingtip mounted propulsion assemblies 26, landing feet 30a, 30b, 30c, 30d are positioned at the maximum outboard distance from the center of gravity of aircraft 10 located, for example, at the intersection of axes 10a, 10b, 10c, which provides for maximum landing stability and tip-over stability for aircraft 10.

UAS and other VTOL aircraft may be used to deliver payloads such as packages, supplies or weapons to intended targets such as personnel, customers or combat targets on the ground. One goal of payload delivery missions is to deliver the payload to the intended target as quickly and efficiently as possible. Previous UAS have utilized enclosures that carry an internal payload, requiring a human operator to load and unload the payload using a door. Because human intervention is required to open and close the door of the enclosure, the internal payload is unable to be released while the UAS is airborne or in remote areas.

Aircraft 10 may autonomously transport and remotely release payloads 32a, 32b to a desired location, in which case aircraft 10 may be referred to as an unmanned aerial vehicle (UAV), an unmanned aerial system (UAS) or a drone. Aircraft 10 includes payload saddle assemblies 34a, 34b coupled to pylons 18, 20 used to secure payloads 32a, 32b, respectively. Payload saddle assemblies 34a, 34b releasably secure payloads 32a, 32b against the inboard sides of pylons 18, 20, although in other embodiments either or both of payload saddle assemblies 34a, 34b may secure payloads 32a, 32b against the outboard sides of pylons 18, 20. The types of payloads that may be secured by payload saddle assemblies 34a, 34b are numerous. In the illustrated embodiment, payloads 32a, 32b are externally-mounted backpacks with straps for personal use by an individual, which may include consumer backpacks or standard issue military backpacks depending on the application. In other implementations, payloads 32a, 32b may be deliverable packages. In certain military applications, payloads 32a, 32b may be weapons such as explosives intended for a military target.

In response to a command from a remote location such as a ground base, payload saddle assemblies 34a, 34b release payloads 32a, 32b at a desired location. Thus, payloads 32a, 32b may be transported to and released at a remote site without requiring ground personnel at the remote site. Payloads 32a, 32b may be released while aircraft 10 is either airborne or landed on a surface such as the ground. Payload saddle assemblies 34a, 34b allow aircraft 10 to carry payloads 32a, 32b without the use of an enclosure system or other structure that requires ground personnel to release payloads 32a, 32b, thereby automating the payload delivery mission, reducing labor costs and reducing dependency on personnel.

It should be appreciated that aircraft 10 is merely illustrative of a variety of aircraft that can implement the embodiments disclosed herein. Indeed, payload saddle assemblies 34a, 34b may be implemented on any aircraft. Other aircraft implementations can include helicopters, quadcopters, hybrid aircraft, compound helicopters, tiltwing aircraft, tiltrotor aircraft, quad tiltrotor aircraft, gyrocopters, propeller-driven airplanes, drones and the like. As such, those skilled in the art will recognize that payload saddle assemblies 34a, 34b can be integrated into a variety of aircraft configurations. It should be appreciated that even though aircraft are particularly well-suited to implement the embodiments of the present disclosure, non-aircraft vehicles and devices can also implement the embodiments.

Figure 2A:
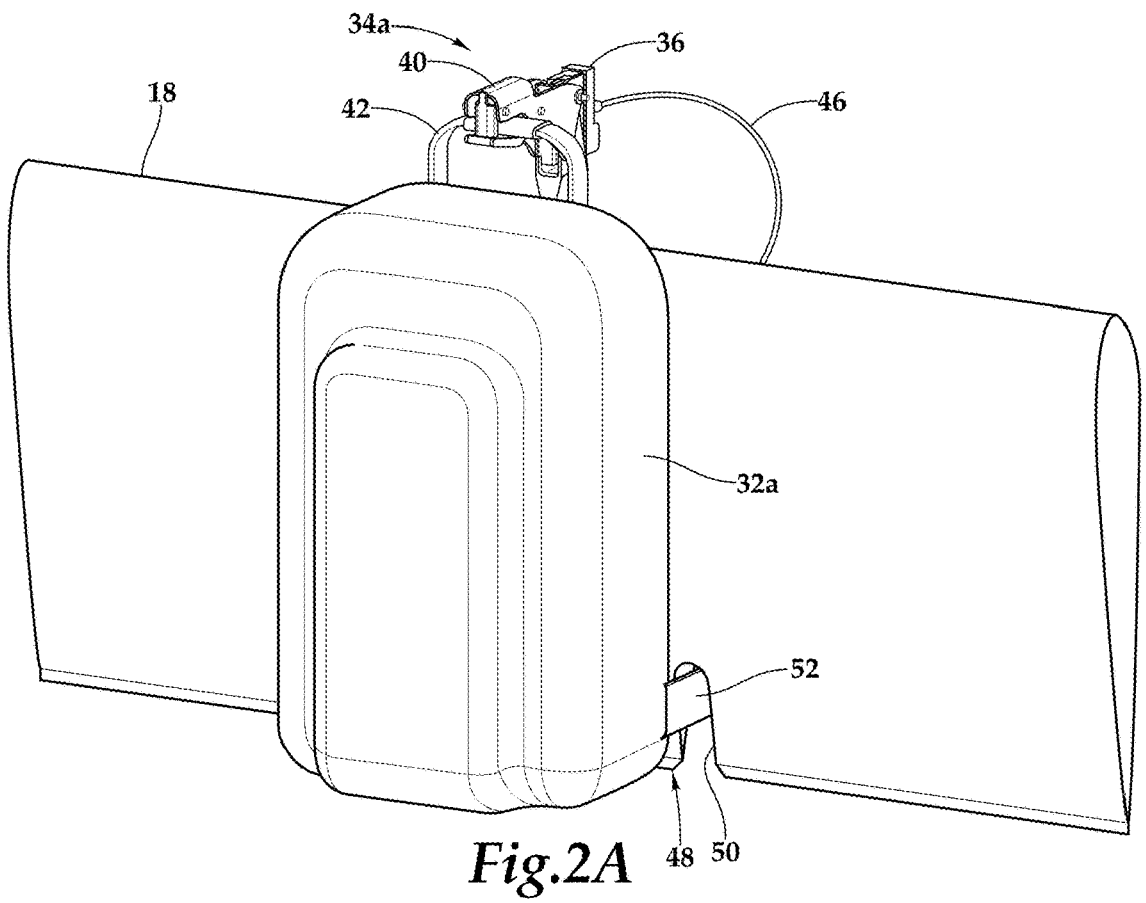
Figure 2B:
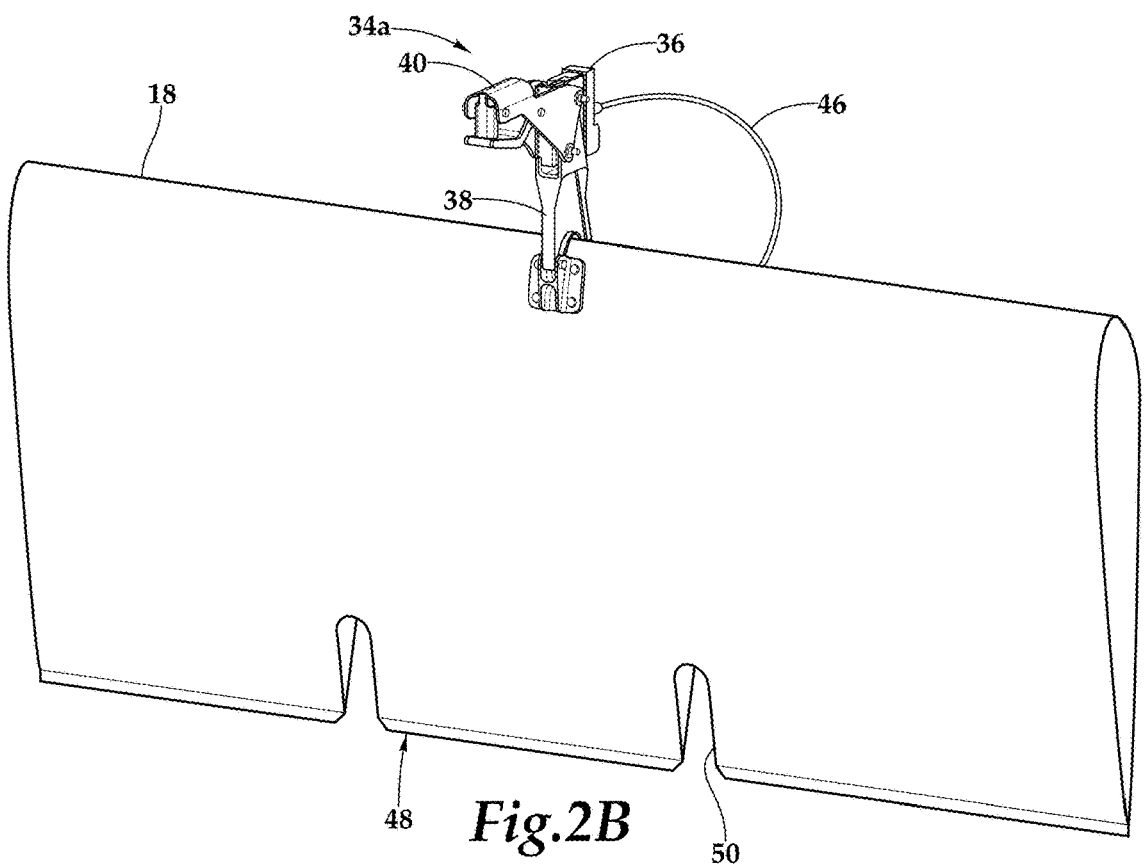

Referring additionally to FIGS. 2A-2D in the drawings, pylon 18 including payload saddle assembly 34a is schematically illustrated. Pylon 18 and payload saddle assembly 34a are substantially similar to pylon 20 and payload saddle assembly 34b therefore, for sake of efficiency, certain features will be disclosed only with regard to pylon 18 and payload saddle assembly 34a. One having ordinary skill in the art, however, will fully appreciate an understanding of pylon 20 and payload saddle assembly 34b based upon the disclosure herein of pylon 18 and payload saddle assembly 34a. FIGS. 2A and 2B show the inboard side of pylon 18 while FIGS. 2C and 2D show the outboard side of pylon 18. Payload 32a has been removed from view in FIGS. 2B and 2D to show underlying components of payload saddle assembly 34a.

Payload saddle assembly 34a includes a latch assembly 36 coupled to the leading edge of pylon 18. Latch assembly 36 includes a bifurcated base 38 that rests on the leading edge of pylon 18 and is coupled to both the inboard and outboard sides of pylon 18 via fasteners. Latch assembly 36 has a cantilevered configuration and includes a cantilevered arm 40 projecting in the inboard direction of aircraft 10. In other embodiments, cantilevered arm 40 may project in the outboard direction of aircraft 10. Latch assembly 36 is shown in the closed position to secure handle 42 of payload 32a. Latch assembly 36 is coupled to an electrical or communication port 44 in pylon 18 via a connector 46. Latch assembly 36 draws power from aircraft 10 using port 44 and connector 46 to perform certain operations such as opening to release payload 32a. Latch assembly 36 may also receive commands or signals from flight control system 22 via connector 46. Payload saddle assembly 34a includes a retainer 48 that secures payload 32a against the inboard side of pylon 18. Retainer 48 is integrated on the trailing end of pylon 18. More particularly, retainer 48 is formed by notches 50 in the trailing end of pylon 18. Payload 32a includes a strap 52 such as a waist strap that wraps around retainer 48 via notches 50 to secure payload 32a against pylon 18. When loading payload 32a onto payload saddle assembly 34a, strap 52 may be slipped over the trailing end of retainer 48 or buckled onto retainer 48 using buckle 52a.

Figure 3A:
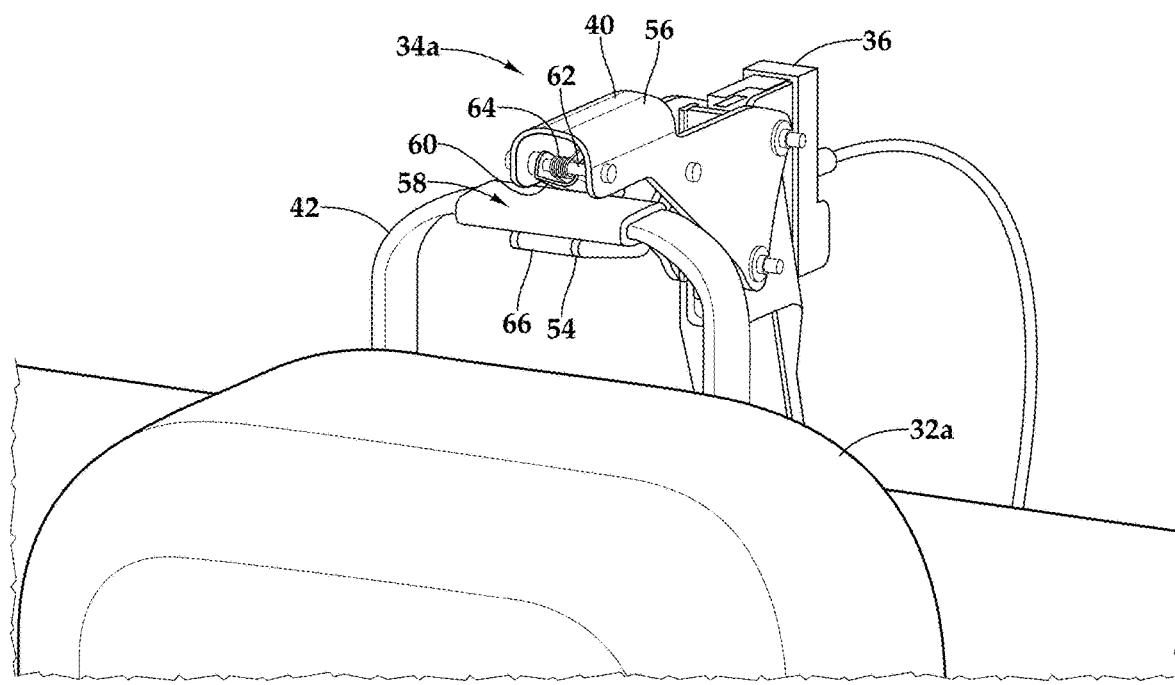
FIGS. 3A-3B are isometric views of a latch assembly for a payload saddle assembly in accordance with embodiments of the present disclosure.
Figure 3B:
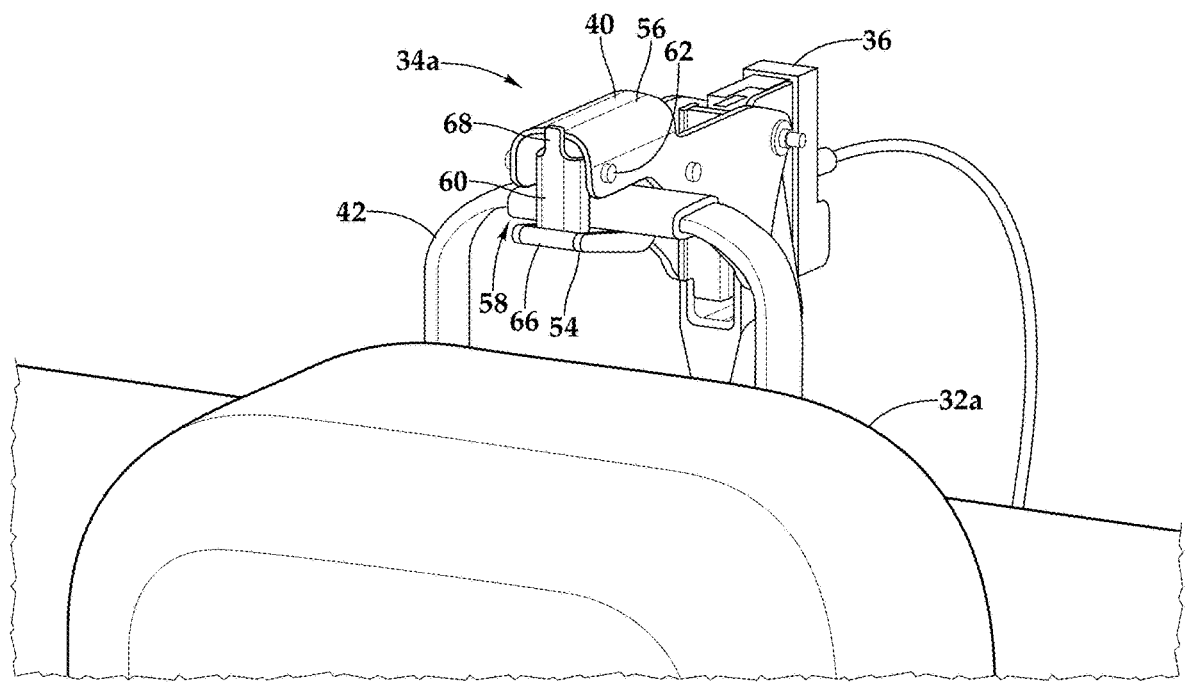

Referring additionally to FIGS. 3A-3B in the drawings, the inboard side of latch assembly 36 is shown in greater detail. Handle 42 of payload 32a hangs from a hook 54 rotatably coupled to cantilevered arm 40 when hook 54 is in the closed position as shown. Hanging handle 42 from hook 54 prevents payload 32a from falling and reduces downward or aftward shifting in both forward and VTOL flight. The underlying parts of cantilevered arm 40 are protected by a cantilevered arm housing 56. Cantilevered arm 40 and hook 54 form a payload loading passage 58 when hook 54 is in the closed position. Handle 42 is received onto hook 54 via payload loading passage 58. To prevent handle 42 from falling off hook 54 when hook 54 is in the closed position, latch assembly 36 includes a one-way gate flap 60 interposed between cantilevered arm 40 and hook 54 to bridge payload loading passage 58. Gate flap 60 is rotatably coupled to cantilevered arm 40 via a hinge joint 62. FIG. 3A shows gate flap 60 rotated into an open position so that handle 42 may be received onto hook 54 via payload loading passage 58. Payload 32a is manually loaded onto hook 54 in this manner. Hinge joint 62 includes a spring 64 that biases gate flap 60 into the closed position shown in FIG. 3B. Gate flap is prevented from rotating outward and away from cantilevered arm 40 by gate pin 66 formed at one end of hook 54 as well as gate stop 68 that contacts housing 56. When gate flap 60 is in the closed position, handle 42 is blocked from exiting or falling off hook 54 while hook 54 is in the closed position.

Figure 4C:
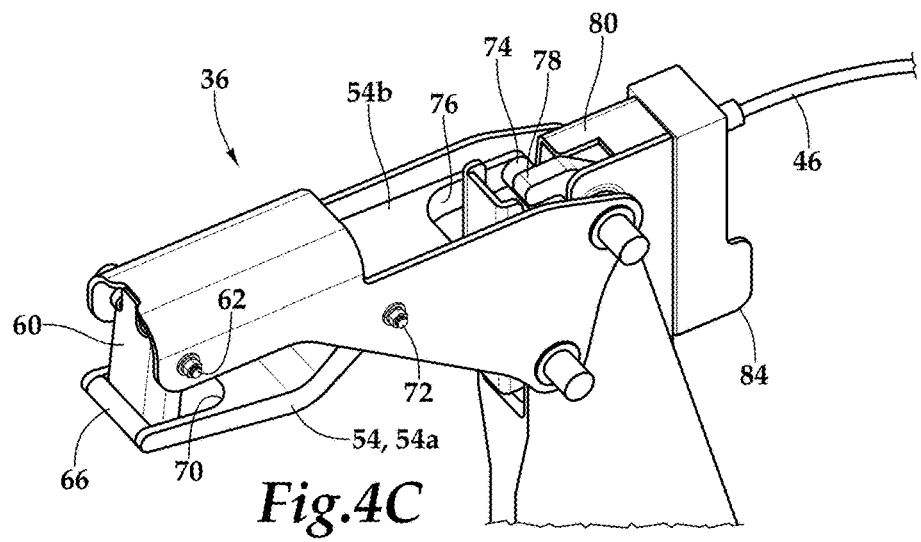
Figure 4D:
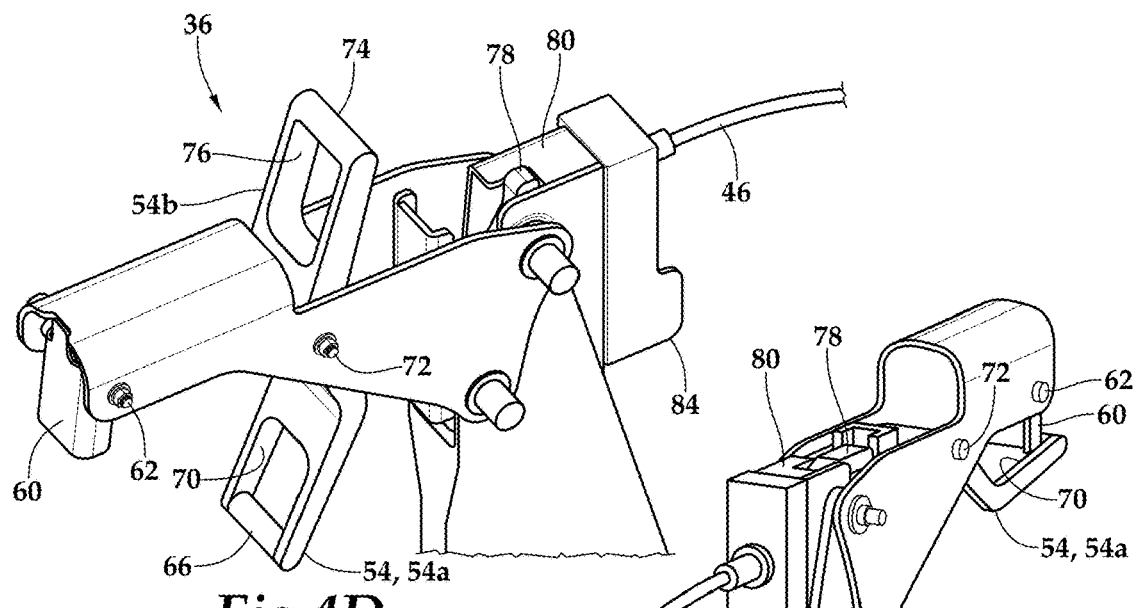
Figure 4E:
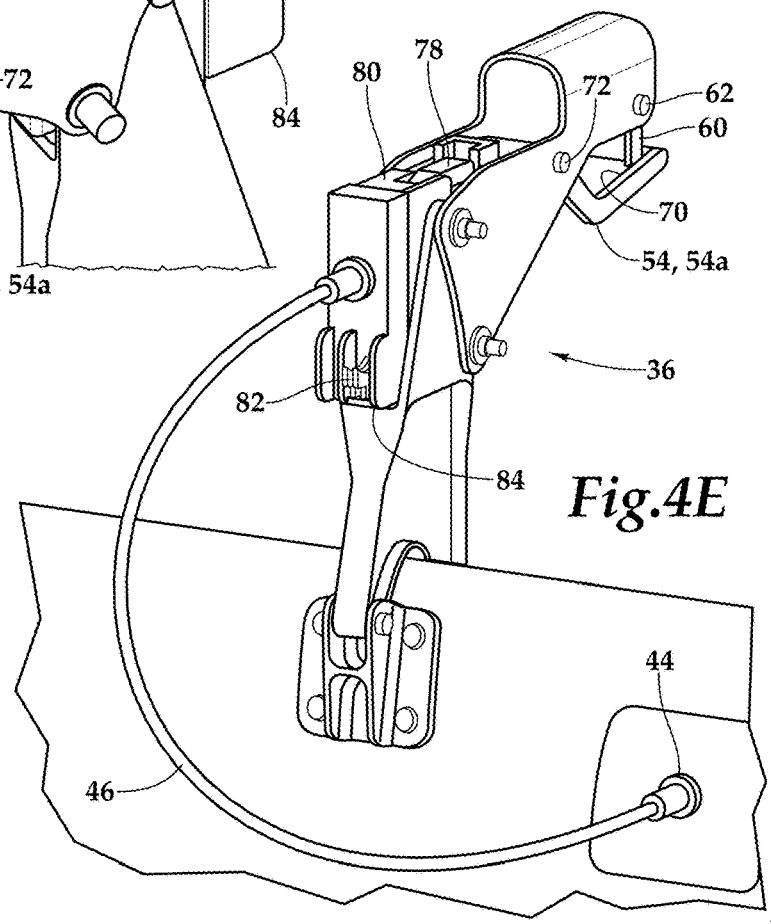

Referring additionally to FIGS. 4A-4E in the drawings, the various positions of latch assembly 36 are shown in greater detail. FIGS. 4A, 4C and 4E show hook 54 in the closed position and FIGS. 4B and 4D show hook 54 in the open position. One end of hook 54 forms an aperture 70 to provide clearance for gate flap 60 to rotate about hinge joint 62 between the open and closed positions shown in FIGS. 3A and 3B. Aperture 70 also provides clearance for gate flap 60 to rest against gate pin 66 when hook 54 is in the closed position.

Hook 54 is pivotable between the open and closed positions about a pivot joint 72. In some embodiments, pivot joint 72 may include a spring to bias hook 54 into the closed position. Hook 54 has a generally two-tier structure including a flat lower tier 54a providing a flat surface on which handle 42 may rest, a flat upper tier 54b and a diagonal portion interconnecting lower and upper tiers 54a, 54b. Upper tier 54b of hook 54 includes a hook pin 74 formed in part by aperture 76. Hook pin 74 is shaped and positioned to interface a hook latch 78. An actuator 80, which receives power from electrical port 44 via connector 46, rotates hook latch 78 between a locked position to lock hook 54 in the closed position as best seen in FIG. 4C and an unlocked position to release hook 54 into the open position as best seen in FIG. 4D. In the illustrated embodiment, actuator 80 is an electromechanical rotary actuator, although in other embodiments actuator 80 may be any rotary or linear latch actuator and may be powered electrically or hydraulically. In yet other embodiments, hook 54 and hook latch 78 may be magnetically or electromagnetically engaged and disengaged to lock or unlock hook 54.

Latch assembly 36 releasably secures payload 32a via handle 42 by securing payload 32a in the closed position as best seen in FIG. 4A and releasing payload 32a in the open position as best seen in FIG. 4B. When it is desired to release payload 32a, aircraft 10 may receive a command from a remote location that causes actuator 80 to rotate hook latch 78 into the unlocked position best seen in FIG. 4D. Once hook pin 74 is unlocked, hook 54 is free to pivot from the closed position to the open position in response to the weight of payload 32a. FIG. 4B shows payload 32a falling from latch assembly 36 after hook 54 has been unlocked and opened while aircraft 10 is in the VTOL orientation. Because the open ends of notches 50 are on the trailing end of pylon 18, strap 52 is free to fall off the trailing end of retainer 48 when hook 54 is opened. Hook latch 78 may also be manually unlocked using a trigger 82, which is protected from inadvertent engagement by a trigger guard 84. Trigger 82 may be used to release payload 32a in the absence of a command from a remote location, in the event actuator 80 fails or for any other reason. Payload saddle assembly 34a secures payload 32a to aircraft 10 by preventing excessive movement in flight, yet allowing payload 32a to be released from aircraft 10 using a single latch or actuation point. Payloads such as backpacks may be quickly and easily installed onto payload saddle assembly 34a by a single operator without requiring tools.

Figure 5:
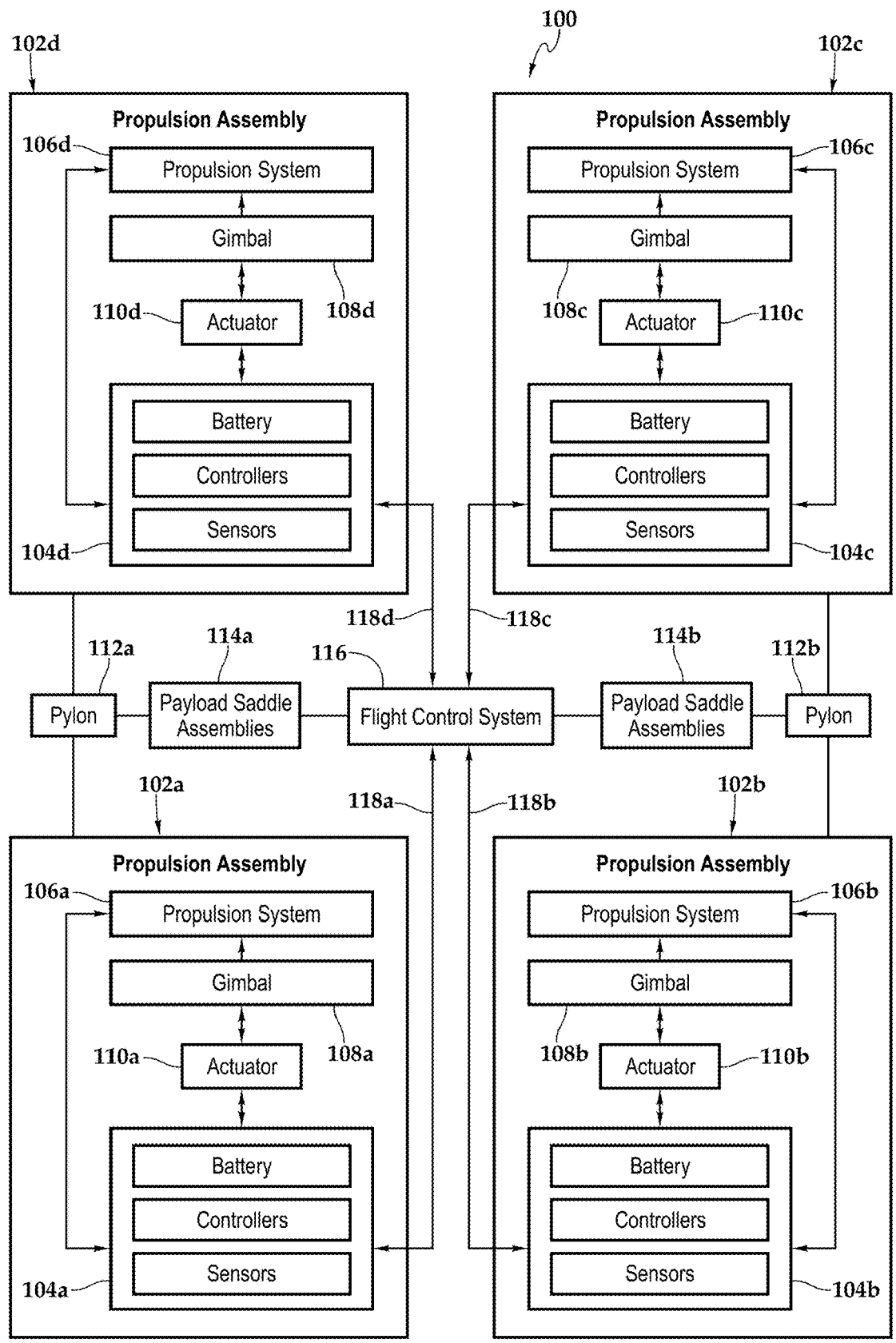
FIG. 5 is a block diagram of one implementation of a thrust array and a flight control system for an aircraft having payload saddle assemblies in accordance with embodiments of the present disclosure.

Referring next to FIG. 5, a block diagram illustrates one implementation of a propulsion and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes various electronic components 104a including one or more batteries, one or more controllers and one or more sensors. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including one or more batteries, one or more controllers and one or more sensors. Propulsion assembly 102b also includes a propulsion system 106b and a two-axis gimbal 108b operated by one or more actuators 110b. Propulsion assembly 102c includes an electronics node 104c depicted as including one or more batteries, one or more controllers and one or more sensors. Propulsion assembly 102c also includes a propulsion system 106c and a two-axis gimbal 108c operated by one or more actuators 110c. Propulsion assembly 102d includes an electronics node 104d depicted as including one or more batteries, one or more controllers and one or more sensors. Propulsion assembly 102d also includes a propulsion system 106d and a two-axis gimbal 108d operated by one or more actuators 110d.

Propulsion assemblies 102a, 102b, 102c, 102d may be connected to one another in various configurations via pylons 112a, 112b. For example, propulsion assemblies 102a, 102b, 102c, 102d may be mounted on wings and the wings may be connected by pylons 112a, 112b. In other embodiments, one or more of propulsion assemblies 102a, 102b, 102c, 102d may be mounted directly onto pylons 112a, 112b. Payload saddle assemblies 114a, 114b are coupled to pylons 112a, 112b to releasably secure payloads to aircraft 100. Flight control system 116 is operably associated with each of propulsion assemblies 102a, 102b, 102c, 102d and is linked to electronics nodes 104a, 104b, 104c, 104d by a fly-by-wire communications network depicted as arrows 118a, 118b, 118c, 118d. Flight control system 116 receives sensor data from and sends commands to propulsion assemblies 102a, 102b, 102c, 102d to enable flight control system 116 to independently control each of propulsion assemblies 102a, 102b, 102c, 102d, as discussed herein. Flight control system 116 is also in communication with payload saddle assemblies 114a, 114b and may send commands to the latch assemblies of payload saddle assemblies 114a, 114b to release the payloads thereon. In some embodiments, flight control system 116 may send such a command to one or more of payload saddle assemblies 114a, 114b in response to a signal received by aircraft 100 from a remote system.

Figure 6:
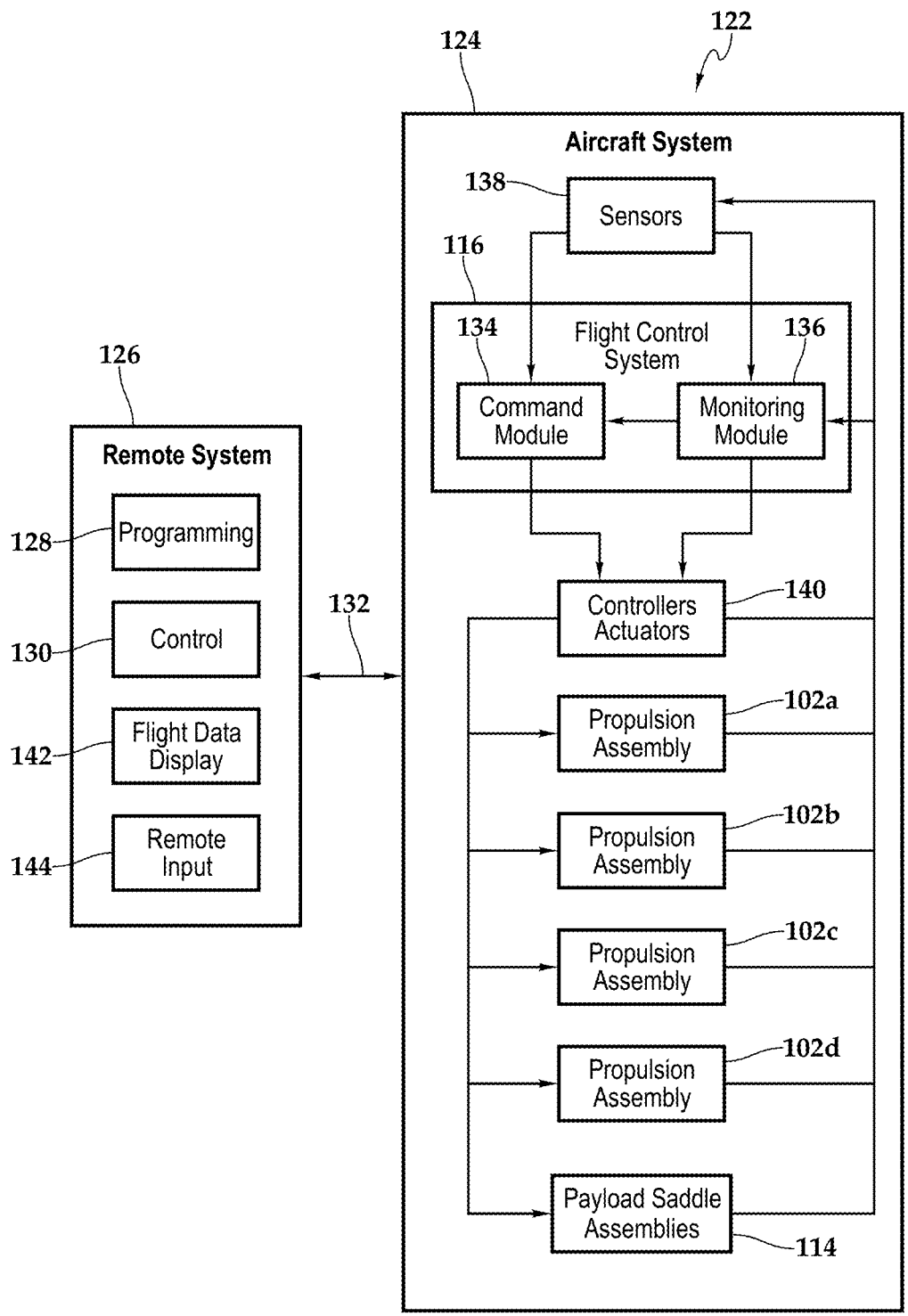
FIG. 6 is a block diagram of autonomous and remote control systems for an aircraft having payload saddle assemblies in accordance with embodiments of the present disclosure.

Referring additionally to FIG. 6 in the drawings, a block diagram depicts a control system 122 operable for use with aircraft 100 or aircraft 10 of the present disclosure. In the illustrated embodiment, system 122 includes two primary computer based subsystems; namely, an aircraft system 124 and a remote system 126. In some implementations, remote system 126 includes a programming application 128 and a remote control application 130. Programming application 128 enables a user to provide a flight plan and mission information to aircraft 100 such that flight control system 116 may engage in autonomous control over aircraft 100. For example, programming application 128 may communicate with flight control system 116 over a wired or wireless communication channel 132 to provide a flight plan including, for example, a starting point, a trail of waypoints and an ending point such that flight control system 116 may use waypoint navigation during the mission. In addition, programming application 128 may provide one or more tasks to flight control system 116 for aircraft 100 to accomplish during the mission such as delivery of a payload to a desired location. For example, programming application 128 may send one or more commands to flight control system 116 via communication channel 132 that cause flight control system 116 to command one or more of payload saddle assemblies 114 to release their respective payloads. In this example, the command(s) from flight control system 116 may cause the latch assemblies of payload saddle assemblies 114 to open, thereby allowing the payloads to fall to the ground. Following programming, aircraft 100 may operate autonomously responsive to commands generated by flight control system 116.

In the illustrated embodiment, flight control system 116 includes a command module 134 and a monitoring module 136. It is to be understood by those skilled in the art that these and other modules executed by flight control system 116 may be implemented in a variety of forms including hardware, software, firmware, special purpose processors and/or combinations thereof. Flight control system 116 receives input from a variety of sources including internal sources such as sensors 138, controllers/actuators 140, propulsion assemblies 102a, 102b, 102c, 102d, payload saddle assemblies 114 as well as external sources such as remote system 126, global positioning system satellites or other location positioning systems and the like.

During the various operating modes of aircraft 100 such as the vertical takeoff flight mode, the hover flight mode, the forward flight mode, transition flight modes and the vertical landing flight mode, command module 134 provides commands to controllers/actuators 140. These commands enable independent operation of propulsion assemblies 102a, 102b, 102c, 102d including rotor speed, thrust vector and the like and the latch assemblies of payload saddle assemblies 114. Flight control system 116 receives feedback from controllers/actuators 140, propulsion assemblies 102a, 102b, 102c, 102d and payload saddle assemblies 114. This feedback is processed by monitoring module 136 that can supply correction data and other information to command module 134 and to controllers/actuators 140. Sensors 138, such as an attitude and heading reference system (AHRS) with solid-state or microelectromechanical systems (MEMS), gyroscopes, accelerometers and magnetometers as well as other sensors including positioning sensors, speed sensors, environmental sensors, fuel sensors, temperature sensors, location sensors and the like also provide information to flight control system 116 to further enhance autonomous control capabilities.

Some or all of the autonomous control capability of flight control system 116 can be augmented or supplanted by remote flight control from, for example, remote system 126. Remote system 126 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 126 communicates with flight control system 116 via communication link 132 that may include both wired and wireless connections.

While operating remote control application 130, remote system 126 is configured to display information relating to one or more aircraft of the present disclosure on one or more flight data display devices 142. Display devices 142 may be configured in any suitable form, including, for example, liquid crystal displays, light emitting diode displays, augmented displays or any suitable type of display. Remote system 126 may also include audio output and input devices such as a microphone, speakers and/or an audio port allowing an operator to communicate with other operators or a base station. Display device 142 may also serve as a remote input device 144 if a touch screen display implementation is used, however, other remote input devices, such as a keyboard or joystick, may alternatively be used to allow an operator to provide control commands to an aircraft being operated responsive to remote control.

Figure 7D:
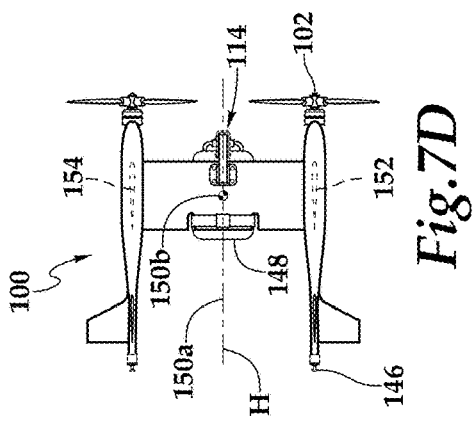
Figure 7C:
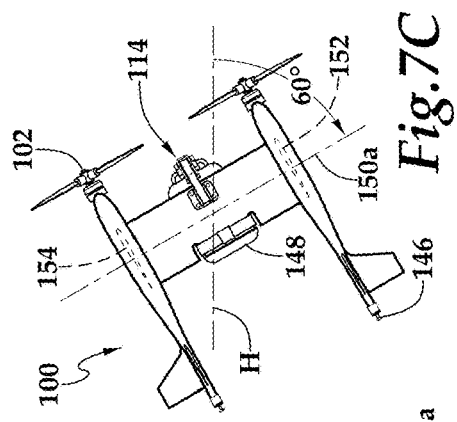
Figure 7B:
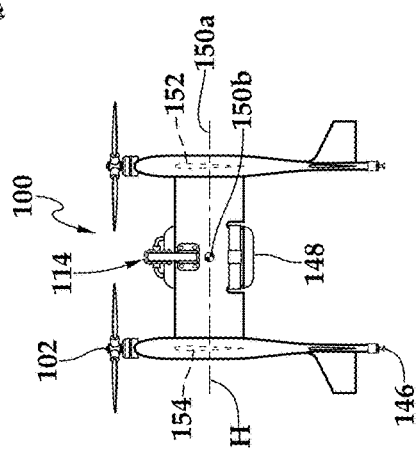
Figure 7A:
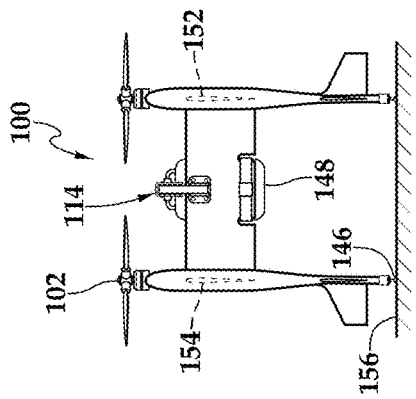

Referring additionally to FIGS. 7A-7I in the drawings, a sequential flight-operating scenario of aircraft 100 including payload saddle assembly 114 is depicted. As best seen in FIG. 7A, aircraft 100 is in a tailsitter position on a surface such as the ground, a helipad or the deck of an aircraft carrier with landing feet 146 in contact with the surface. When aircraft 100 is ready for a mission, flight control system 116 commences operations providing flight commands to the various components of aircraft 100. Flight control system 116 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight. In other implementations, aircraft 100 may be a manned aircraft operated at least in part by a pilot. Payload 148 has been manually loaded on payload saddle assembly 114 prior to takeoff.

As best seen in FIG. 7B, aircraft 100 has performed a vertical takeoff and is engaged in thrust-borne lift in the VTOL orientation of aircraft 100. As illustrated, the rotor assemblies of propulsion assemblies 102 are each rotating in substantially the same horizontal plane. As longitudinal axis 150a and lateral axis 150b (denoted as the target) are both in a horizontal plane H that is normal to the local vertical in the earth's reference frame, aircraft 100 has a level flight attitude. In the VTOL orientation, wing 152 is the forward wing and wing 154 is the aft wing. As discussed herein, flight control system 116 independently controls and operates each propulsion assembly 102 including independently controlling speed and thrust vectoring. During hover, flight control system 116 may utilize differential speed control and/or differential or collective thrust vectoring of propulsion assemblies 102 to provide hover stability for aircraft 100 and to provide pitch, roll, yaw and translation authority for aircraft 100.

After vertical ascent to the desired elevation, aircraft 100 may begin the transition from thrust-borne lift to wing-borne lift. As best seen from the progression of FIGS. 7B-7D, aircraft 100 is operable to pitch down from the VTOL orientation toward the forward flight, or biplane, orientation to enable high speed and/or long range forward flight. As seen in FIG. 7C, longitudinal axis 150a extends out of the horizontal plane H such that aircraft 100 has an inclined flight attitude of about sixty degrees pitch down. Flight control system 116 may achieve this operation through speed control of some or all of propulsion assemblies 102, thrust vectoring of some or all of propulsion assemblies 102 or any combination thereof.

As best seen in FIGS. 7D and 7E, aircraft 100 has completed the transition to the forward flight orientation with the rotor assemblies of propulsion assemblies 102 each rotating in substantially the same vertical plane. In the forward flight orientation, wing 154 is the upper wing positioned above wing 152, which is the lower wing. By convention, longitudinal axis 150a has been reset to be in the horizontal plane H, which also includes lateral axis 150b, such that aircraft 100 has a level flight attitude in the forward flight orientation. As forward flight with wing-borne lift requires significantly less power than VTOL flight with thrust-borne lift, the operating speed of some or all of propulsion assemblies 102 may be reduced. In certain embodiments, some of propulsion assemblies 102 of aircraft 100 could be shut down during forward flight. In the forward flight orientation, the independent control provided by flight control system 116 over each propulsion assembly 102 provides pitch, roll and yaw authority for aircraft 100. The retainer and latch assembly of payload saddle assembly 114 secure payload 148 during forward flight to minimize excessive movement of payload 148.

As aircraft 100 approaches target ground location 156, which may be a landing zone, payload drop zone, waypoint or other stopping point depending on the mission, aircraft 100 may begin its transition from wing-borne lift to thrust-borne lift in a forward flight-to-VTOL transition phase best seen from the progression of FIGS. 7E-7G. Aircraft 100 is operable to pitch up from the forward flight orientation to the VTOL orientation to enable, as in the illustrated example, a vertical landing operation. As seen in FIG. 7F, longitudinal axis 150a extends out of the horizontal plane H such that aircraft 100 has an inclined flight attitude of about thirty degrees pitch up. Flight control system 116 may achieve this operation through speed control of some or all of propulsion assemblies 102, thrust vectoring of some or all of propulsion assemblies 102 or any combination thereof. In FIG. 7G, aircraft 100 has completed the transition from the forward flight orientation to the VTOL orientation. By convention, longitudinal axis 150a has been reset to be in the horizontal plane H which also includes lateral axis 150b such that aircraft 100 has a level flight attitude in the VTOL orientation.

Once aircraft 100 has completed the transition to the VTOL orientation, aircraft 100 may hover and commence its vertical descent to target ground location 156. In FIG. 7H, aircraft 100 descends toward target ground location 156, which in the illustrated embodiment is a landing zone. In FIG. 7I, aircraft 100 rests in its tailsitter orientation on landing zone 156. Upon landing, flight control system 116 may receive a command from a remote system to release payload 148 to target ground location 156 using the latch assembly of payload saddle assembly 114. Payload 148 may then be retrieved by ground personnel or another autonomous aircraft or vehicle. In other embodiments, payload 148 may instead be released to target ground location 156 while aircraft 100 is airborne, such as in the airborne position shown in FIG. 7G or 7H.

Figure 8A:
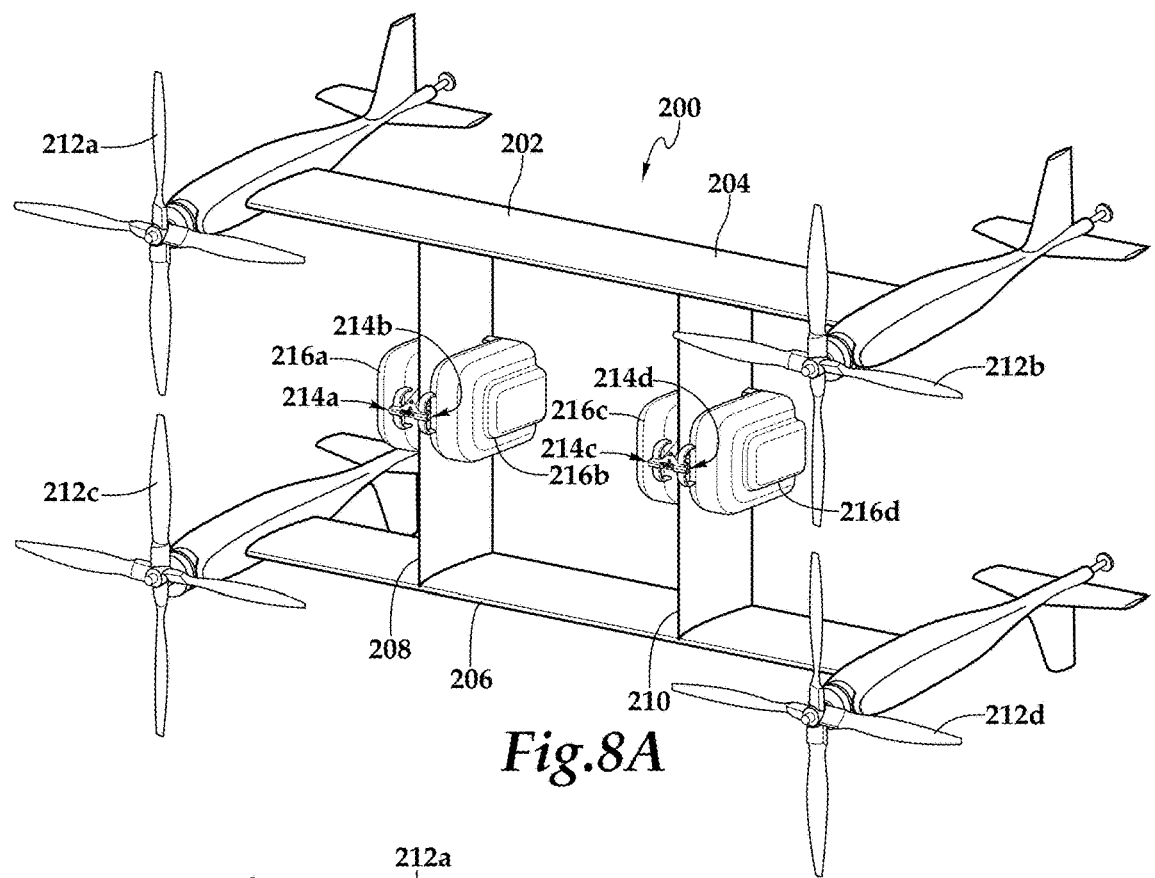
FIGS. 8A-8F are schematic illustrations of various aircraft with payload saddle assemblies in different configurations in accordance with embodiments of the present disclosure.
Figure 8B:
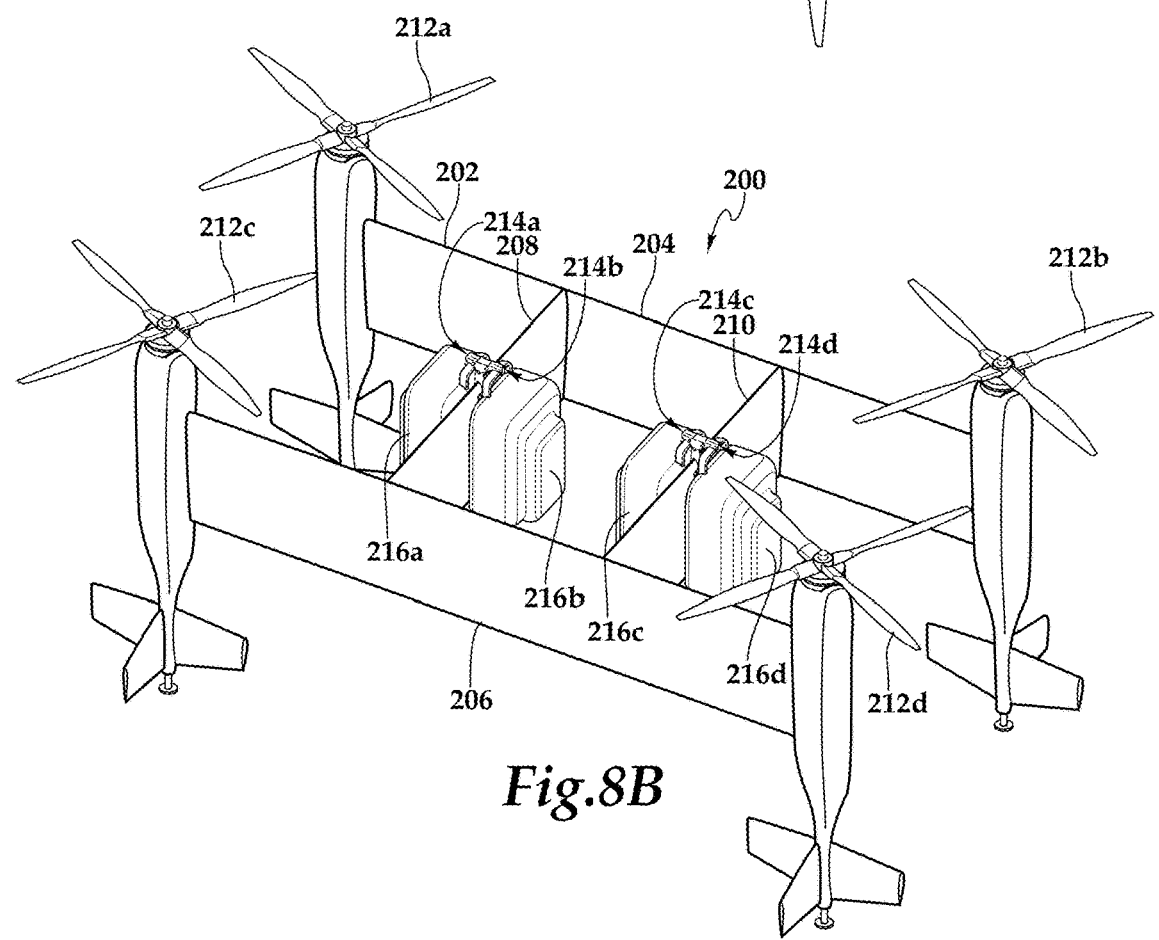

Referring to FIGS. 8A-8F in the drawings, various tailsitter aircraft having payload saddle assemblies in different configurations are schematically illustrated. In FIGS. 8A and 8B, aircraft 200 has an airframe 202 including wings 204, 206 with pylons 208, 210 extending perpendicularly therebetween. The two-dimensional distributed thrust array of aircraft 200 includes a plurality of propulsion assemblies 212a, 212b, 212c, 212d. In the illustrated embodiment, propulsion assemblies 212a, 212b are coupled at the wingtips of wing 204 and propulsion assemblies 212c, 212d are coupled at the wingtips of wing 206. FIG. 8A depicts aircraft 200 in the biplane orientation wherein propulsion assemblies 212a, 212b, 212c, 212d provide forward thrust with the forward airspeed of aircraft 200 providing wing-borne lift enabling aircraft 200 to have a high speed and/or high endurance forward flight mode. FIG. 8B depicts aircraft 200 in the VTOL orientation wherein propulsion assemblies 212a, 212b, 212c, 212d provide thrust-borne lift.

Pylon 208 includes two payload saddle assemblies 214a, 214b and pylon 210 includes two payload saddle assemblies 214c, 214d. Payload saddle assemblies 214a, 214b are in the approximate center of pylon 208 and payload saddle assemblies 214c, 214d are in the approximate center of pylon 210. Payload saddle assembly 214a secures payload 216a to the outboard side of pylon 208, payload saddle assembly 214b secures payload 216b to the inboard side of pylon 208, payload saddle assembly 214c secures payload 216c to the inboard side of pylon 210 and payload saddle assembly 214d secures payload 216d to the outboard side of pylon 210. Payload saddle assemblies 214a, 214b, 214c, 214d and payloads 216a, 216b, 216c, 216d are in collinear alignment to form a single-file line, which may be useful in balancing the weight carried by aircraft 200. Depending on the mission, payloads 216a, 216b, 216c, 216d may be released simultaneously or at different times.

Figure 8C:
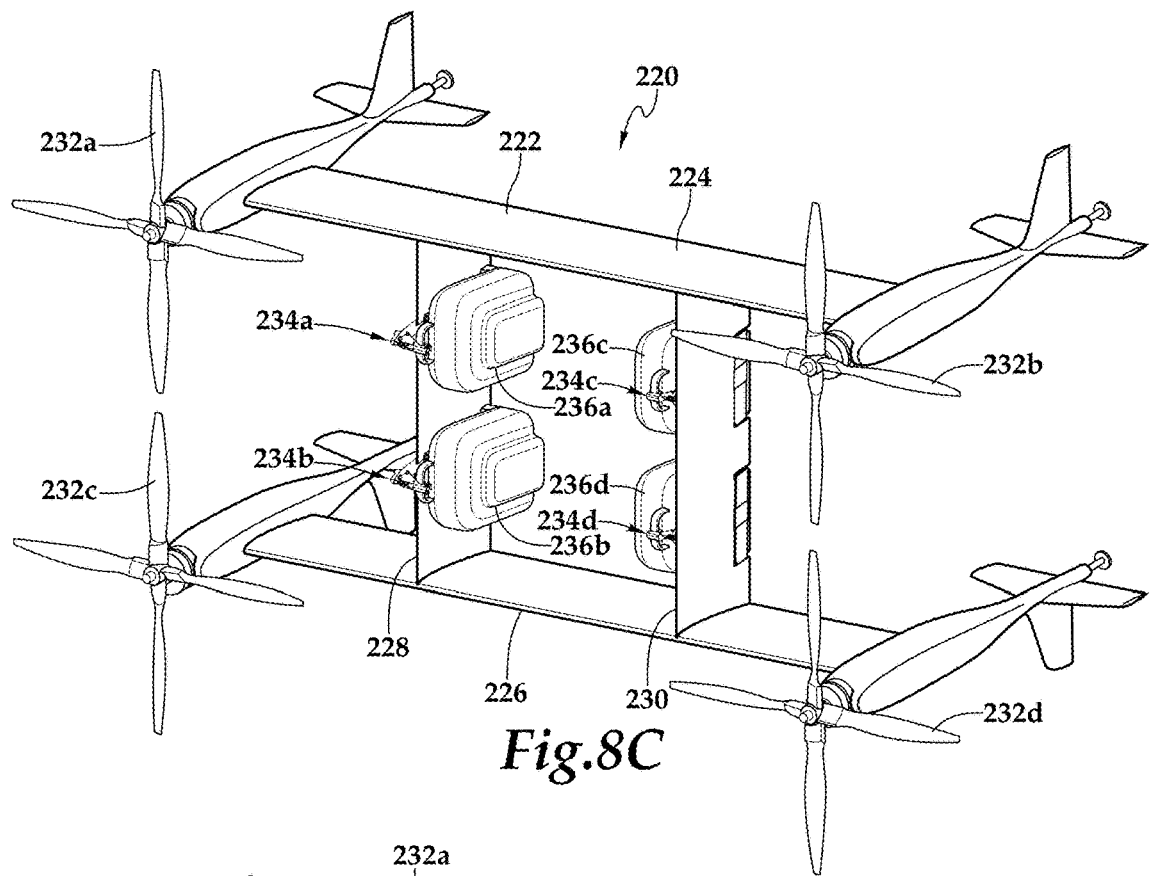
Figure 8D:
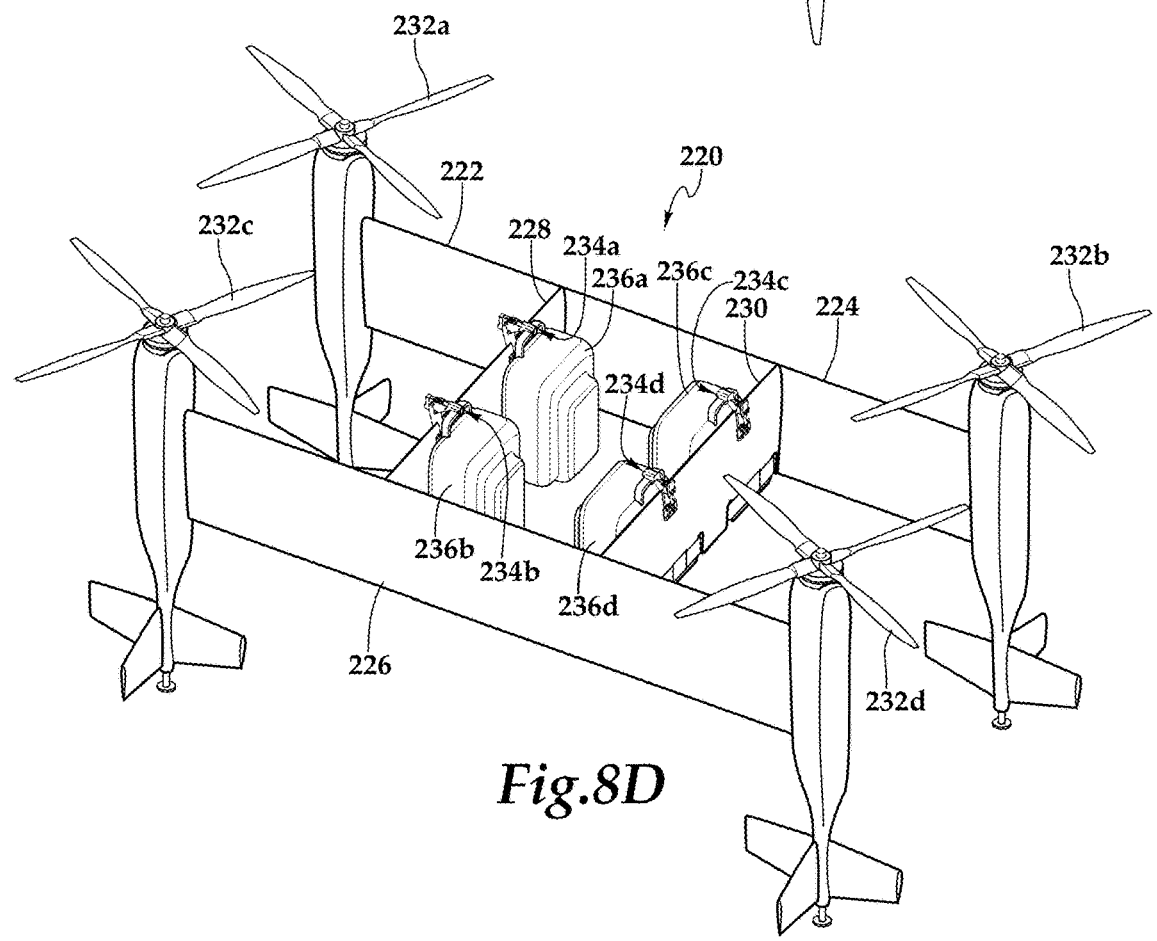

In FIGS. 8C and 8D, aircraft 220 has an airframe 222 including wings 224, 226 with pylons 228, 230 extending perpendicularly therebetween. The two-dimensional distributed thrust array of aircraft 220 includes a plurality of propulsion assemblies 232a, 232b, 232c, 232d. In the illustrated embodiment, propulsion assemblies 232a, 232b are coupled at the wingtips of wing 224 and propulsion assemblies 232c, 232d are coupled at the wingtips of wing 226. FIG. 8C depicts aircraft 220 in the biplane orientation wherein propulsion assemblies 232a, 232b, 232c, 232d provide forward thrust with the forward airspeed of aircraft 220 providing wing-borne lift enabling aircraft 220 to have a high speed and/or high endurance forward flight mode. FIG. 8D depicts aircraft 220 in the VTOL orientation wherein propulsion assemblies 232a, 232b, 232c, 232d provide thrust-borne lift.

Pylon 228 includes two payload saddle assemblies 234a, 234b and pylon 230 includes two payload saddle assemblies 234c, 234d. Payload saddle assemblies 234a, 234b secure payloads 236a, 236b to the inboard side of pylon 228 and payload saddle assemblies 234c, 234d secure payloads 236c, 236d to the inboard side of pylon 230 so that payloads 236a, 236b face payloads 236c, 236d. In this configuration, payloads 236a, 236b, 236c, 236d are secured closer to the center of gravity of aircraft 220. Depending on the size of aircraft 220 and payloads 236a, 236b, 236c, 236d, different numbers of payload saddle assemblies 234a, 234b, 234c, 234d may be coupled to pylons 228, 230 such three, four, five or more payload saddle assemblies on each pylon. Depending on the mission, payloads 236a, 236b, 236c, 236d may be released simultaneously or at different times.

Figure 8E:
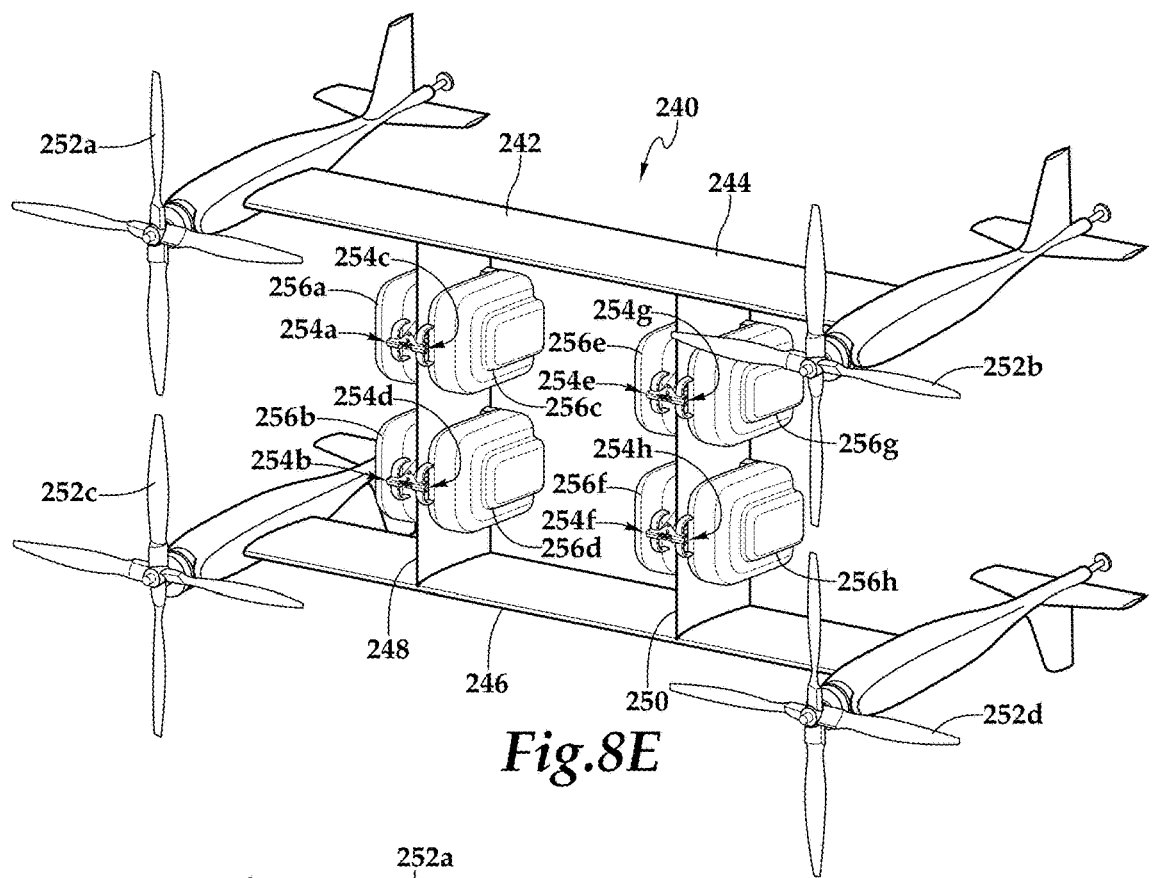
Figure 8F:
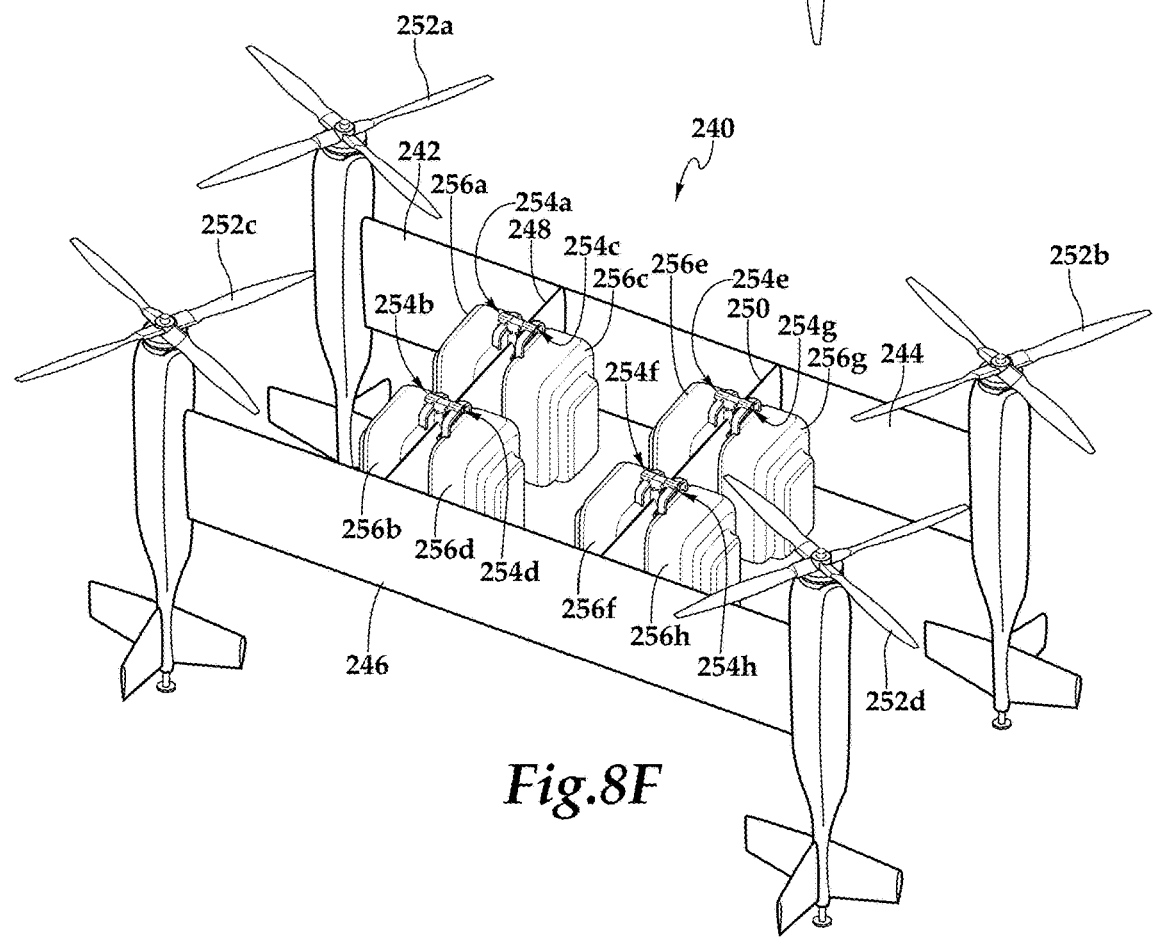

In FIGS. 8E and 8F, aircraft 240 has an airframe 242 including wings 244, 246 with pylons 248, 250 extending perpendicularly therebetween. The two-dimensional distributed thrust array of aircraft 240 includes a plurality of propulsion assemblies 252a, 252b, 252c, 252d. In the illustrated embodiment, propulsion assemblies 252a, 252b are coupled at the wingtips of wing 244 and propulsion assemblies 252c, 252d are coupled at the wingtips of wing 246. FIG. 8E depicts aircraft 240 in the biplane orientation wherein propulsion assemblies 252a, 252b, 252c, 252d provide forward thrust with the forward airspeed of aircraft 240 providing wing-borne lift enabling aircraft 240 to have a high speed and/or high endurance forward flight mode. FIG. 8F depicts aircraft 240 in the VTOL orientation wherein propulsion assemblies 252a, 252b, 252c, 252d provide thrust-borne lift.

Pylon 248 includes four payload saddle assemblies 254a, 254b, 254c, 254d and pylon 250 includes four payload saddle assemblies 254e, 254f, 254g, 254h. Payload saddle assemblies 254a, 254b secure payloads 256a, 256b to the outboard side of pylon 248, payload saddle assemblies 254c, 254d secure payloads 256c, 256d to the inboard side of pylon 248, payload saddle assemblies 254e, 254f secure payloads 256e, 256f to the inboard side of pylon 250 and payload saddle assemblies 254g, 254h secure payloads 256g, 256h to the outboard side of pylon 250 so that payloads 256c, 256d face payloads 256e, 256f and payloads 256a, 256b face away from payloads 256g, 256h. Payload saddle assemblies 254a, 254c, 254e, 254g and payloads 256a, 256c, 256e, 256g are in collinear alignment to form a single-file line. Payload saddle assemblies 254b, 254d, 254f, 254h and payloads 256b, 256d, 256f, 256h are in collinear alignment to form a single-file line. In the configuration of FIGS. 8E and 8F, the space provided by pylons 248, 250 has been optimized to carry as many payloads as possible for aircraft 240. Larger aircraft may carry additional payloads. In other embodiments, wings 244, 246 may also include payload saddle assemblies to transport additional payloads. Depending on the mission, payloads 256a, 256b, 256c, 256d, 256e, 256f, 256g, 256h may be released simultaneously or at different times.

Figure 9A:
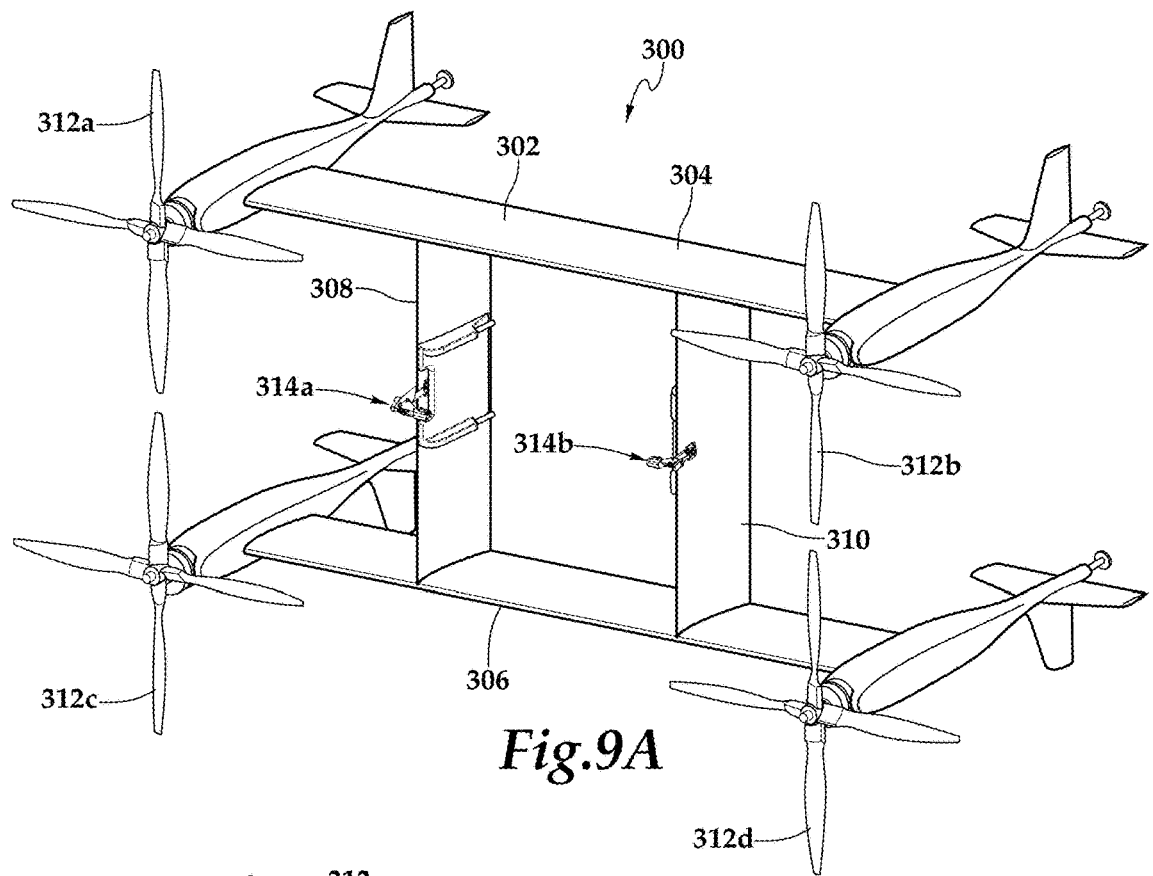
FIGS. 9A-9B are schematic illustrations of an aircraft with payload saddle assemblies including retaining walls and retainer posts in accordance with embodiments of the present disclosure.
Figure 9B:
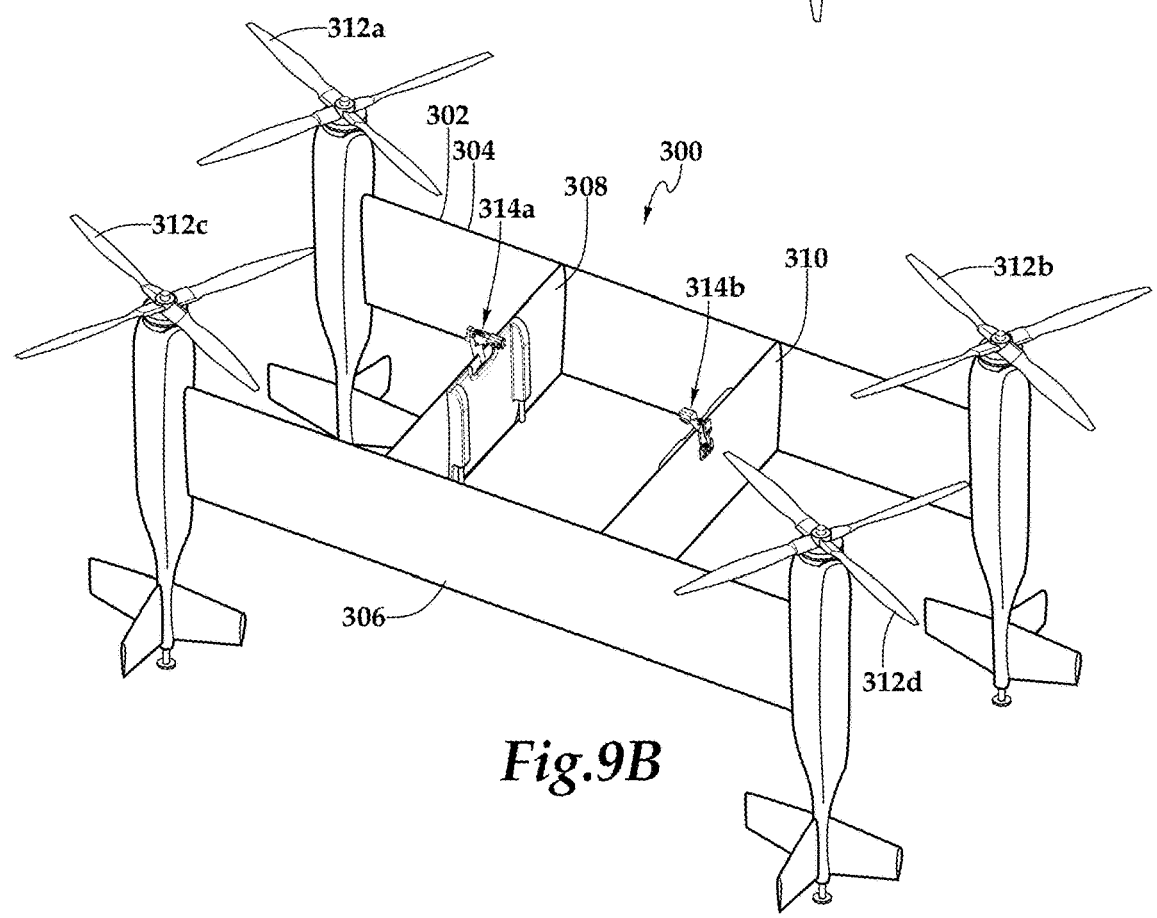

Referring to FIGS. 9A-9B in the drawings, a tailsitter aircraft including payload saddle assemblies is schematically illustrated and generally designated 300. Aircraft 300 has an airframe 302 including wings 304, 306 with pylons 308, 310 extending perpendicularly therebetween. The two-dimensional distributed thrust array of aircraft 300 includes a plurality of propulsion assemblies 312a, 312b, 312c, 312d. In the illustrated embodiment, propulsion assemblies 312a, 312b are coupled at the wingtips of wing 304 and propulsion assemblies 312c, 312d are coupled at the wingtips of wing 306. FIG. 9A depicts aircraft 300 in the biplane orientation wherein propulsion assemblies 312a, 312b, 312c, 312d provide forward thrust with the forward airspeed of aircraft 300 providing wing-borne lift enabling aircraft 300 to have a high speed and/or high endurance forward flight mode. FIG. 9B depicts aircraft 300 in the VTOL orientation wherein propulsion assemblies 312a, 312b, 312c, 312d provide thrust-borne lift. Payload saddle assemblies 314a, 314b are coupled to pylons 308, 310 to secure payloads to the inboard sides of pylons 308, 310, respectively.

Figure 10A:
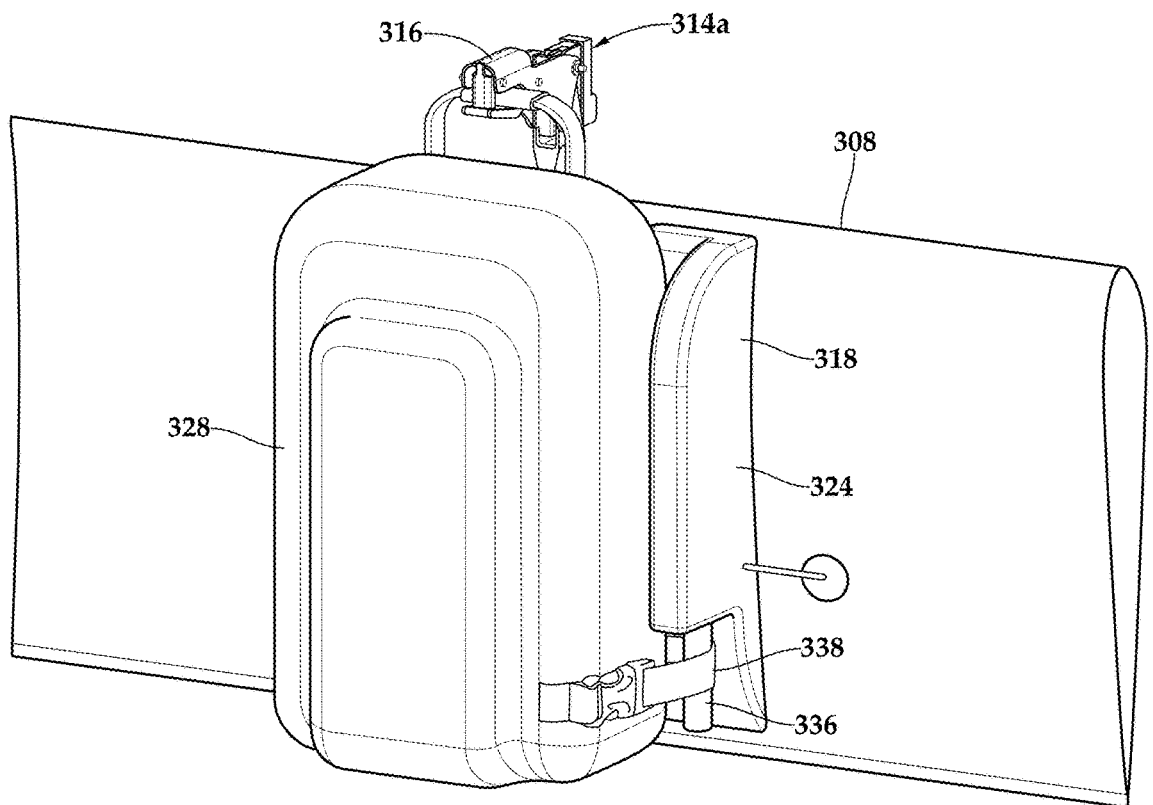
FIGS. 10A-10B are isometric views of a payload saddle assembly including retaining walls and retainer posts in accordance with embodiments of the present disclosure.
Figure 10B:
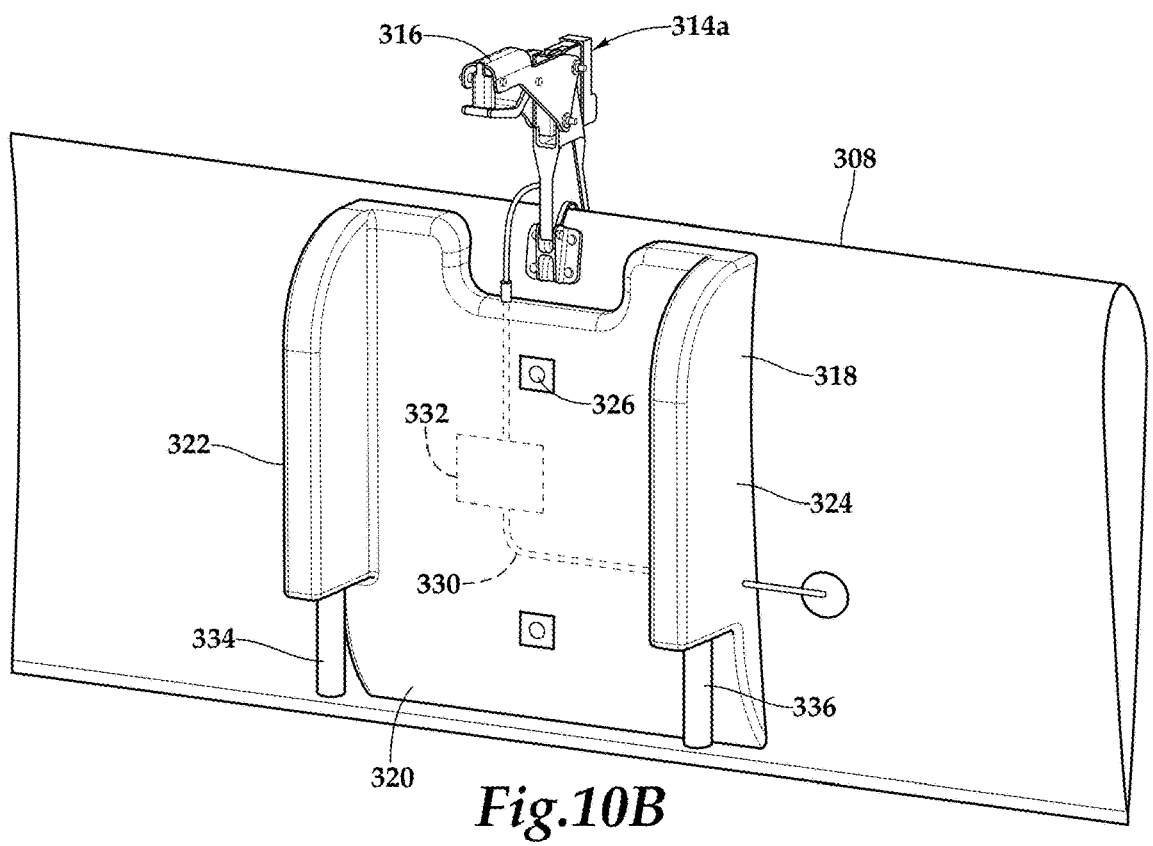

Referring additionally to FIGS. 10A-10B in the drawings, payload saddle assembly 314a is shown in greater detail. Pylon 308 and payload saddle assembly 314a are substantially similar to pylon 310 and payload saddle assembly 314b therefore, for sake of efficiency, certain features will be disclosed only with regard to pylon 308 and payload saddle assembly 314a. One having ordinary skill in the art, however, will fully appreciate an understanding of pylon 310 and payload saddle assembly 314b based upon the disclosure herein of pylon 308 and payload saddle assembly 314a.

Payload saddle assembly 314a includes latch assembly 316, which includes the same or similar features as those described for latch assembly 36 in FIGS. 2A-2D, 3A-3B and 4A-4E. Payload saddle assembly 314a is coupled to the leading edge of pylon 308. Retainer 318 includes support wall 320 interposed between and interconnecting side retaining walls 322, 324. Support wall 320 is coupled to the inboard side of pylon 308 using fasteners 326, although in other embodiments support wall 320 and/or retaining walls 322, 324 may be integral with or adhered to pylon 308. Support wall 320 and/or retaining walls 322, 324 may be formed from high strength and lightweight materials such as fiberglass, carbon, plastic, metal or other suitable material or combination of materials. Retaining walls 322, 324 support the weight of payload 328 when aircraft 300 is in the forward flight orientation. Connector 330, which provides power and/or commands to latch assembly 316, may pass through or behind support wall 320. A circuit board 332 inside or behind support wall 320 may control the commands sent to latch assembly 316. Each retaining wall 322, 324 includes a retainer post 334, 336 extending in the aftward direction. In the illustrated embodiment, payload 328 is a backpack that includes side compression straps 338 that may be used to compress the thickness of the backpack. Each compression strap 338 wraps around a respective retainer post 334, 336 to reduce or prevent shifting of payload 328 during flight.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A payload transportation and deployment system for an aircraft having an airframe member and a VTOL orientation, the payload transportation and deployment system comprising:
   a releasable payload;
   a latch assembly including a base coupled to a leading edge of the airframe member and a cantilevered arm projecting in a direction that is normal to a chord direction of the airframe member, the latch assembly movable between a plurality of positions including an open position and a closed position, the latch assembly configured to secure the payload in the closed position and release the payload in the open position; and
   a retainer configured to secure the payload against the airframe member during payload transportation;
   wherein, the latch assembly is configured to move from the closed position to the open position to release the payload when the aircraft is in the VTOL orientation.

2. The payload transportation and deployment system as recited in claim 1 wherein, the payload is a backpack.

3. The payload transportation and deployment system as recited in claim 1 wherein, the latch assembly comprises a hook configured to pivot about a pivot joint, the hook pivotable about the pivot joint into the plurality of positions including the open and closed positions.

4. The payload transportation and deployment system as recited in claim 3 wherein, the payload comprises a handle; and
   wherein, the hook is configured to releasably secure the payload via the handle.

5. The payload transportation and deployment system as recited in claim 3 wherein, the latch assembly comprises a hook latch movable between a locked position to lock the hook in the closed position and an unlocked position to release the hook.

6. The payload transportation and deployment system as recited in claim 5 wherein, the hook comprises a hook pin; and
   wherein, the hook latch interfaces the hook pin to lock the hook in the closed position.

7. The payload transportation and deployment system as recited in claim 5 wherein, the latch assembly comprises an actuator configured to move the hook latch between the locked and unlocked positions.

8. The payload transportation and deployment system as recited in claim 5 wherein, the latch assembly comprises a trigger to manually move the hook latch between the locked and unlocked positions.

9. The payload transportation and deployment system as recited in claim 5 wherein, the hook is configured to pivot from the closed position to the open position when the hook latch is in the unlocked position in response to the weight of the payload.

10. The payload transportation and deployment system as recited in claim 3 wherein, the payload comprises a handle; and
    wherein, the hook and the cantilevered arm form a payload loading passage when the hook is in the closed position to receive the handle of the payload.

11. The payload transportation and deployment system as recited in claim 10 wherein, the latch assembly comprises a one-way gate flap bridging the payload loading passage, the gate flap configured to rotate between an open position to receive the handle onto the hook and a closed position to block the handle from exiting the hook when the hook is in the closed position.

12. The payload transportation and deployment system as recited in claim 11 wherein, the gate flap is rotatably coupled to the cantilevered arm via a hinge joint; and
    wherein, the hinge joint includes a spring configured to bias the gate flap into the closed position.

13. The payload transportation and deployment system as recited in claim 11 wherein, the hook forms an aperture to provide clearance for the gate flap to rotate between the open and closed positions.

14. The payload transportation and deployment system as recited in claim 1 wherein, the payload comprises a strap; and
wherein, the retainer includes a plurality of notches in a trailing end of the airframe member, the payload strap configured to wrap around the retainer via the notches to secure the payload against the airframe member.

15. The payload transportation and deployment system as recited in claim 1 wherein, the retainer comprises first and second retaining walls coupled to the airframe member to laterally secure the payload to the airframe member when the aircraft is in a forward flight orientation.

16. The payload transportation and deployment system as recited in claim 15 wherein, the payload comprises first and second straps; and
wherein, each retaining wall comprises a retainer post, the first and second straps each configured to wrap around a respective retainer post.

17. The payload transportation and deployment system as recited in claim 15 wherein, the retainer further comprises a support wall interconnecting the first and second retaining walls, the support wall coupled to the airframe member.

18. A payload transportation and deployment system for an aircraft having an airframe member and a VTOL orientation, the payload transportation and deployment system comprising:
a releasable payload having a strap;
a latch assembly coupled to the airframe member, the latch assembly movable between a plurality of positions including an open position and a closed position, the latch assembly configured to secure the payload in the closed position and release the payload in the open position; and
a retainer including a plurality of notches in a trailing end of the airframe member;
wherein, the payload strap is configured to wrap around the retainer via the notches to secure the payload against the airframe member during payload transportation; and
wherein, the latch assembly is configured to move from the closed position to the open position to release the payload when the aircraft is in the VTOL orientation.

19. A payload transportation and deployment system for an aircraft having an airframe member and a VTOL orientation, the payload transportation and deployment system comprising:
a releasable payload having first and second straps;
a latch assembly coupled to the airframe member, the latch assembly movable between a plurality of positions including an open position and a closed position, the latch assembly configured to secure the payload in the closed position and release the payload in the open position; and
a retainer including first and second retaining walls each having a retainer post, the retainer coupled to the airframe member such that the first and second retaining walls laterally secure the payload relative to the airframe member during payload transportation;
wherein, each of the first and second straps wraps around a respective retainer post to secure the payload against the airframe member during payload transportation; and
wherein, the latch assembly is configured to move from the closed position to the open position to release the payload when the aircraft is in the VTOL orientation.

* * * * *